US012784429B2

(12) United States Patent
Kong et al.

(10) Patent No.: US 12,784,429 B2
(45) Date of Patent: Nov. 3, 2026

(54) CONVOLUTION OPERATION METHOD AND CONVOLUTION OPERATION DEVICE

(71) Applicant: Shanghai Zhaoxin Semiconductor Co., Ltd., Shanghai (CN)

(72) Inventors: Weiman Kong, Shanghai (CN); Xingang Zhai, Shanghai (CN)

(73) Assignee: GLENFLY TECH CO., LTD., Shanghai (CN)

( * ) Notice: Subject to any disclaimer, the term of this patent is extended or adjusted under 35 U.S.C. 154(b) by 1337 days.

(21) Appl. No.: 17/151,311

(22) Filed: Jan. 18, 2021

(65) Prior Publication Data

US 2022/0012587 A1 Jan. 13, 2022

(30) Foreign Application Priority Data

Jul. 9, 2020 (CN) ......................... 202010656506.3
Jul. 9, 2020 (CN) ......................... 202010657082.2

(51) Int. Cl.
*G06F 17/15* (2006.01)
*G06V 10/44* (2022.01)
*G06V 10/82* (2022.01)

(52) U.S. Cl.
CPC .............. *G06V 10/82* (2022.01); *G06F 17/15* (2013.01); *G06V 10/454* (2022.01)

(58) Field of Classification Search
CPC ........ G06F 17/15; G06F 17/153; G06F 17/16; G06N 3/04; G06N 3/045; G06N 3/0464; G06N 3/08; G06N 3/047; G06N 3/0475; G06N 3/0495; G06N 3/0499; G06N 3/0455; G06N 3/0895; G06N 3/09; G06N 3/091; G06N 3/092; G06N 3/094; G06N 3/096;

(Continued)

(56) References Cited

U.S. PATENT DOCUMENTS

| | | | | |
|---|---|---|---|---|
| 11,475,100 | B2 * | 10/2022 | Han | G06F 17/16 |
| 2018/0189643 | A1 * | 7/2018 | Kim | G06N 3/063 |
| 2019/0122328 | A1 * | 4/2019 | Kong | G06F 9/3004 |
| 2019/0392287 | A1 * | 12/2019 | Ovsiannikov | G06N 3/08 |

(Continued)

OTHER PUBLICATIONS

Hennessy, John L., et al. Computer Architecture : A Quantitative Approach, Elsevier Science & Technology, 2014. ProQuest Ebook Central,http://ebookcentral.proquest.com/lib/uspto-ebooks/detail.action?docID=404052. (Year: 2014).*

*Primary Examiner* — Andrew Caldwell
*Assistant Examiner* — Huy Duong
(74) *Attorney, Agent, or Firm* — McClure, Qualey & Rodack, LLP

(57) ABSTRACT

A convolution operation method is provided for performing a convolution operation on an input feature map to generate a corresponding output feature map, wherein the input feature map is divided into a plurality of input data blocks, and the convolution operation method includes: dividing each of the input data blocks into a plurality of non-overlapping areas, wherein there is an overlapping area between any two adjacent input data blocks; storing the non-overlapping areas of each input data block into a respective non-overlapping storage space in a cache; generating each input data block according to the area corresponding to each input data block stored in the non-overlapping storage spaces; and performing a convolution operation on the plurality of generated input data blocks to generate the output feature map.

20 Claims, 25 Drawing Sheets

(58) Field of Classification Search
CPC ...... G06N 3/098; G06N 3/0985; G06V 10/82; G06V 10/454; G06V 10/94; H03M 7/40
See application file for complete search history.

(56) References Cited

U.S. PATENT DOCUMENTS

2020/0074288 A1* 3/2020 Zhang ...................... G06N 3/04
2020/0336155 A1* 10/2020 Ovsiannikov ....... H03M 7/6005

* cited by examiner

CONVOLUTION OPERATION METHOD AND CONVOLUTION OPERATION DEVICE

CROSS REFERENCE TO RELATED APPLICATIONS

This Application claims priority of China Patent Application No. 202010656506.3, filed on Jul. 9, 2020, and China Patent Application No. 202010657082.2, filed on Jul. 9, 2020, the entirety of which is incorporated by reference herein.

BACKGROUND OF THE INVENTION

Field of the Invention

The present disclosure relates in general to a convolution operation method and a convolution operation device and, in particular, to a convolution operation method and a convolution operation device for dividing an input data block according to the overlap between input data blocks of an input feature map.

Description of the Related Art

Convolutional Neural Networks (CNN) are currently the main area of interest in the development of deep neural networks. They can be very accurate in image recognition. A typical convolutional neural network includes multiple layers, such as convolution layers, activating layers, pooling layers, and fully connected layers.

Using a convolution operation module (hardware module, such as a CNN accelerator, etc.) independent of the Central Processing Unit (CPU) can effectively increase the speed of a convolution operation. However, the amount of buffer space used for caching operation data (including input data and convolution kernels) in the convolution operation module is limited. When performing a convolution operation, it is impossible to cache all the operation data used by the current convolution layer in the convolution operation module. Therefore, if the operation data used for the convolution operation has not been cached in the convolution operation module, the convolution operation module will suspend the convolution operation and load the required operation data from the storage outside the convolution operation module. The convolution operation module waits for the required operation data to be loaded before continuing the convolution operation, which affects the operation speed of the convolution operation module.

Therefore, how to cache more operation data when the buffer space of the convolution calculation module is limited, and how to load more operation data each time, so as to reduce the number of suspending of the convolution calculation module and thus improve the computational efficiency of the convolution operation module, has become one of the problems that need to be solved in this field.

BRIEF SUMMARY OF THE INVENTION

In view of this, the present invention provides a convolution operation method and a convolution operation device, by caching more operation data in the convolution operation module, and loading more operation data each time, to reduce the number of suspending of the convolution operation module, thereby improve the operation efficiency of the convolution operation module.

In accordance with one feature of the present invention, the present disclosure provides a convolution operation method, for performing a convolution operation on an input feature map to generate a corresponding output feature map, wherein the input feature map is divided into a plurality of input data blocks, and the convolution operation method including: dividing each of the input data blocks into a plurality of non-overlapping areas, wherein there is an overlapping area between any two adjacent input data blocks; storing the non-overlapping areas of each input data block into a respective non-overlapping storage space in a cache; generating each input data block according to the area corresponding to each input data block stored in the non-overlapping storage spaces; and performing a convolution operation on the plurality of generated input data blocks to generate the output feature map.

In accordance with one feature of the present invention, the present disclosure provides a convolution operation device, for performing a convolution operation on an input feature map to generate a corresponding output feature map, wherein the input feature map is divided into a plurality of input data blocks. And, the convolution operation device includes a cache, a calculator, a data processing module, a second-level processing module and a first-level processing module. The calculator is configured to perform the convolution operation on the input data block. The data processing module is coupled to the calculator. The data processing module divides each of the input data blocks into a plurality of non-overlapping areas. There is an overlapping area between any two adjacent input data blocks. The second-level processing module is coupled to the cache. The second-level processing module stores the non-overlapping areas of each input data block into a respective non-overlapping storage space in the cache. The first-level processing module is coupled to the cache and the calculator. The first-level processing module generates each input data block according to the area corresponding to each input data block stored in the non-overlapping storage spaces, and sends the generated input data blocks to the calculator for performing the convolution operation to generate the output feature map.

By means of the convolution operation method and convolution operation device described above, when there is an overlapping area between the input data blocks of the input feature map, the input data block is divided into non-overlapping areas for storing. More input data blocks can be cached in the convolution operation device, thereby reducing the number of suspending of the convolution operation module, thereby improving the operation efficiency of the convolution operation module.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIGS. 6F-1 and 6F-2 are a more detailed processing flow chart of the computing device 500 generating an output feature map in accordance with another embodiment of the present invention.

FIGS. 9F-1 and 9F-2 are more detailed processing flow charts of generating an output feature map using the computing device 800 in accordance with one embodiment of the present invention.

DETAILED DESCRIPTION OF THE INVENTION

Figure 1:
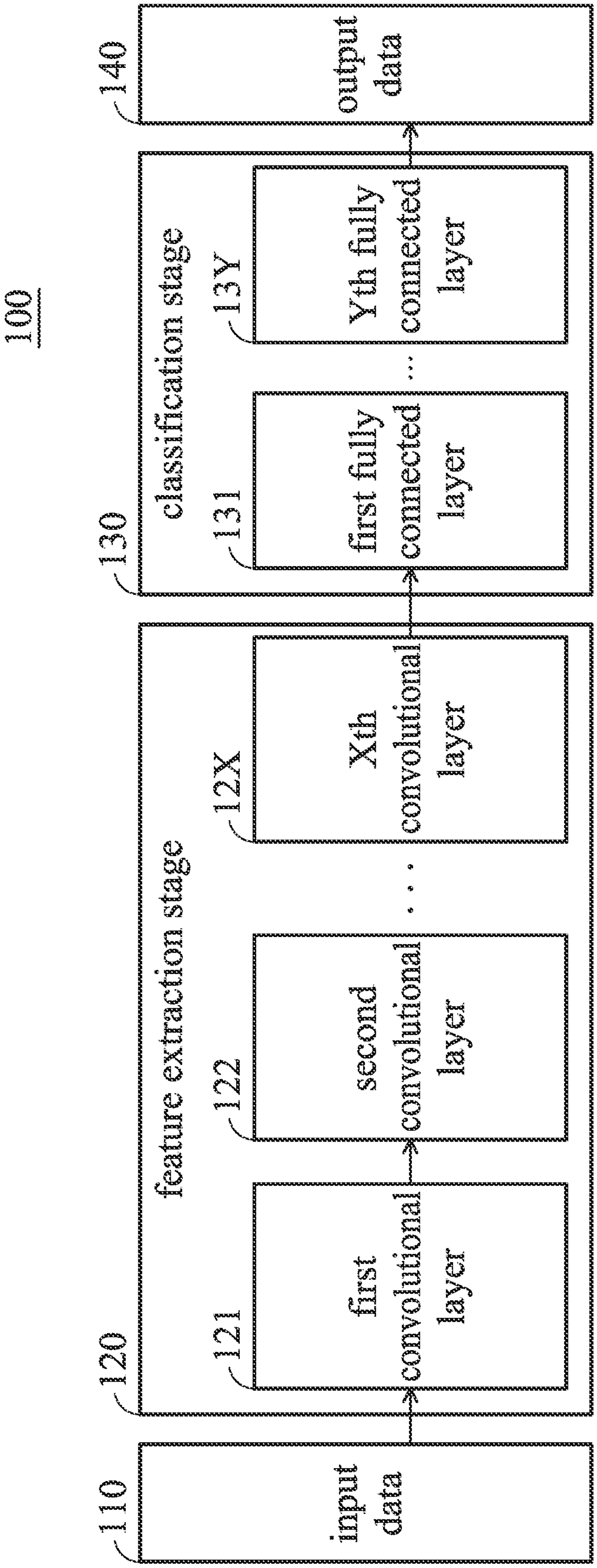
FIG. 1 is a schematic diagram of a convolutional neural network 100 in accordance with one embodiment of the present disclosure.

The following description is made for the purpose of illustrating the general principles of the invention and should not be taken in a limiting sense. The scope of the invention is best determined by reference to the appended claims.

The present invention is described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Two lossless compression algorithms are used in the technical solution in the present disclosure, namely, first-level compression and second-level compression. In order to facilitate the description below, these two compression algorithms are described first. The second-level compression algorithm can be Huffman algorithm, Lempel-Ziv & Welch (LZW) algorithm, etc. The second-level compression algorithm format is the Huffman algorithm format, the Lempel-Ziv & Welch (LZW) algorithm format, or other algorithm formats. In present invention, the convolution operation method and the convolution operation device generally use a second-level compression algorithm to compress the data that has been compressed using a first-level compression algorithm to further improve the compression ratio.

The first-level compression algorithm can be used to compress a matrix containing a lot of elements with a value of 0. The format of the first-level compression algorithm is as follows (containing three fields, where "+" indicates that the two fields are closely connected, and there is no other data in the middle of the two fields).

[Length]+[Mask]+[DesData]

The DesData field represents the target data field, and the DesData field contains all elements in the matrix whose value is not 0. The order of all the elements in the DesData field and their order in the matrix (the order of the elements in the two-dimensional matrix can be arranged in two ways: 1. from left to right, from top to bottom; 2. from top to bottom, from left to right) are the same.

The Mask field represents the mask field, and the length of the Mask field can be set according to the number of elements in the matrix. The Mask field has two functions. The first function is to indicate the number of elements in the matrix. The second function is to mark the position of non-zero elements in the matrix. There are two methods to use the Mask field to indicate the number of elements in the matrix. The first method is to set the length of the Mask field to be equal to the number of elements in the matrix (the case of using the first method will be described later). The second method is to set the length of the Mask field to be greater than the number of elements in the matrix, set the value of the bit corresponding to the last element in the matrix in the Mask field to 1, and the bits that have no corresponding relationship in the matrix in the Mask field are set to 0. In this way, the number of elements in the matrix can be calculated based on the position of the last bit with a value of 1 in the Mask field (the second method will be described later). In the present disclosure, many matrices need to be compressed. When the number of elements in all matrices is the same, the length of the Mask field (the length of the Mask field is the number of bits contained in the Mask field, the same as below) is set to the number of elements in the matrix. For example, when the width and height of all matrices are m and n respectively (that is, the matrix contains m columns and n rows of elements, m and n can be the same or different integers greater than 0), the length of the Mask field is set to m*n (* means multiplication symbol, the same as below) bits. Each element in the matrix one-to-one corresponds to each bit in the Mask field. Each bit with a value of 0 in the Mask field corresponds to an element with a value of 0 in the matrix. Each bit with a value of 1 in the Mask field corresponds to an element with a value other than 0 in the matrix. When the value of an element in the matrix is not 0, the value of this element will be stored in the corresponding position in the DesData field, and the value of the corresponding bit in the Mask field is set to 1. It is worth noting that in another embodiment, a bit with a value of 0 in the Mask field corresponds to an element with a value other than 0 in the matrix, and a bit with a value of 1 in the Mask field corresponds to an element with a value of 0 in the matrix.

Length field represents the length of the DesData field (the length of the DesData field refers to the number of elements in the DesData field, the same as below). There are two methods to use the Length field to express the length of the DesData field, which are called the first length representation method and the second length representation method. In the first length representation method, the value of the Length field is equal to the length of the DesData field, and the maximum length value that the Length field can indicate is equal to the maximum value of the Length field. For example, for a Length field with a length of 1 byte, the Length field can represent the length of the DesData field in the range of 0-255. In the first length representation method, when the length of the Length field is 1 byte, if the length of the DesData field exceeds 255 (such as 260), it cannot be represented by the Length field. If we want to express a length greater than 255, we need to use a longer Length field (for example, if we change the length of the Length field to 2 bytes, we can express the length of 260), but this will increase the storage space occupied by the Length field. To solve this problem, this invention provides a second length representation method that uses Length field to represent the length of DesData field. In the second length representation method, each value of the Length field indicates a specific length value. The maximum number of elements that the Length field can indicate is greater than the maximum value of the Length field. For example, a Length field with a length of 2 bits can represent 4 length values, and the length value represented by each value of the Length field can be preset according to actual needs. For example, in one embodiment, the value of Length field is $[00]_2$ ($[\ ]_2$ means that the number in [ ] is a binary number, the same as below) means that the length of DesData field is 8, and the value of Length field is $[01]_2$ means the length of DesData field is 12, the value of Length field is $[10]_2$, it means the length of DesData field is 18, and the value of Length field is $[11]_2$ means the length of DesData field is 24. If the number of elements with a value other than 0 in the matrix is different from the length represented by the value of the Length field (that is, the number of elements with a value other than 0 in the matrix is not one of 8, 12, 18, or 24), we can choose a value of Length field that is greater than the number of elements contained in the matrix whose value is not 0 and can be represented by the value of Length field. For example, when the number of elements with a value other than 0 contained in the matrix is 6, the minimum length greater than 6 that can be represented by the value of Length field is 8 (the value of the corresponding Length field is $[00]_2$), So we choose the value of Length field to be $[00]_2$. Since the value of Length field is $[00]_2$, it means that the length of DesData field is 8, so when the matrix is compressed, the DesData field will contain 8 elements. The first 6 elements are elements whose value is not 0 in the matrix, and the last 2 elements can be set to 0 or other values. The 6 bits in the mask field corresponding to the 6 elements in the matrix are set to 1, and the other bits are set to 0. During the decompression process, the matrix can be generated according to the position of the bit with the value of 1 in the Mask field and the element value in the DesData field corresponding to the bit with the value of 1 in the Mask field.

For easy understanding, the following example illustrates how to use the first-level compression algorithm to compress the matrix. Assume that the matrix Matrix1 is as follows (assuming that the width (i.e. m) of the matrix is 5 and the height (i.e. n) is 4).

| | | | | |
|---|---|---|---|---|
| 0 | 0 | 8 | 0 | 0 |
| 0 | 0 | 0 | 0 | 5 |
| 0 | 0 | 9 | 10 | 0 |
| 0 | 0 | 0 | 4 | 0 |

When using the first length representation method to express the length of the DesData field with the value of the Length field to compress the matrix Matrix1, set the length of the Length field to 1 byte and the length of the Mask to 20 bits (due to the matrix Matrix1 has 20 (5*4=20) elements, so set the length of the Mask to 20 bits). The compressed data of Matrix1 after the first-level compression is (compress the matrix from left to right, top to bottom):

$$[5]_{10}+[00100,00001,00110,00010]_2+[8,5,9,10,4]_{10}$$

Among them, $[\ ]_{10}$ indicates that the numbers in [ ] are decimal numbers, and $[\ ]_2$ indicates that the numbers in [ ] are binary numbers. The 5 in $[5]_{10}$ means that the DesData field contains 5 elements.

Assuming that each element in the matrix Matrix1 occupies 1 byte of storage space, before compression, Matrix1 needs 20 bytes of storage space. After the first-level compression, the Length field occupies 1 byte of storage space, and the Mask field occupies 3 bytes (20 bits) of storage space. The DesData field occupies 5 bytes of storage space.

That is, Matrix1 needs to occupy 9 bytes of storage space in total after first-level compression. Therefore, in this example, when using the first length representation method, the compression ratio is 9/20.

When the matrix Matrix1 is compressed by using the second length representation method to express the length of the DesData field with the value of the Length field, the length of the Length field is set to 2 bits, and the length of the Mask field is set to 20 bits. When the value of the Length field is $[00]_2$, it means that the length of the DesData field is 8. When the value of the Length field is $[01]_2$, it means that the length of the DesData field is 12. When the value of the Length field is $[10]_2$, it means that the length of the DesData field is 18. When the value of the Length field is $[11]_2$, it means that the length of the DesData field is 24. The compressed data of Matrix1 after first-level compression is (compress the matrix from left to right, top to bottom):

$$[00]_2+[00100,00001,00110,00010]_2+[8,5,9,10,4,0,0,0]_{10}$$

Among them, $[\ ]_{10}$ means that the numbers in [ ] are decimal numbers, and $[\ ]_2$ means that the numbers in [ ] are binary numbers. $[00]_2$ indicates that the DesData field contains 8 elements, and $[00100,00001,00110,00010]_2$ contains only 5 ones, indicating that the matrix Matrix1 contains only 5 elements with a value other than 0. When performing decompression, the last 3 elements in $[8,5,9,10,4,0,0,0]_{10}$ will be ignored.

Assuming that each element in the matrix Matrix1 occupies 1 byte of storage space, before compression, Matrix1 needs 20 bytes of storage space. After the first-level compression, the Length field occupies 2 bits of storage space, and the Mask field occupies 20 bits of storage space. That is, the Length field and the Mask field occupy a total of 3 bytes of storage space (22 bits in total). The DesData field occupies 8 bytes of storage space. That is, after first-level compression, Matrix1 needs to occupy a total of 11 bytes of storage space. Thus, in this example, when using the second length representation method, the compression ratio is 11/20.

In another embodiment, when the number of elements in multiple matrices is different (that is, some matrices have more elements, and some matrices have fewer elements), in order to simplify the solution in the compression process, the length of the Mask field can be set to the number of elements in the matrix with the largest number of elements. In this embodiment, since the length of the Mask field is no longer the same as the number of elements in the matrix, we can no longer use the length of the Mask field to represent the number of elements in the matrix. A new mechanism is needed to express the number of elements in the matrix. To this end, we use the bit corresponding to the last element in the matrix in the Mask field as a marker for calculating the number of elements in the matrix (set the value of this bit to 1). More specifically, when performing matrix compression processing, regardless of whether the last element in the matrix is 0 or not, the corresponding bit in the Mask field is set to 1. All bits after this bit in the Mask field are set to 0. Therefore, by subtracting the number of bits after the last bit with a value of 1 in the Mask field from the total number of bits in the Mask field, the number of elements in the matrix can be obtained. Except the last element in the matrix, if the value of other elements is 0, the corresponding bit in the Mask field is set to 0. If the value of other elements is not 0, the corresponding bit in the Mask field is set to 1. In this way, when performing matrix decompression processing, the number of elements in the matrix can be obtained according to the position of the last bit with a value of 1 in the Mask field. For example, when the size of the matrix with the largest number of elements is 6*4 (that is, it contains 24 elements), set the length of the Mask field to 24 bits. Each element in the matrix corresponds to a bit in the Mask field. Every element with a value of 0 except the last element in the matrix corresponds to a bit with a value of 0 in the Mask field. Each element with a value other than 0 in the matrix except the last element corresponds to a bit with a value of 1 in the Mask field. The last element in the matrix (the value is 0 or the value is not 0) corresponds to the last bit with the value 1 in the Mask field. In this embodiment, since the bit corresponding to the last element of the matrix in the Mask field must be 1, during decompression processing, the value of this bit cannot be used to determine whether the last element of the matrix is not 0. So we need to store the value of the last element of the matrix into the DesData field (even if its value is 0).

In this embodiment, when compressing the matrix Matrix1 using the first length representation method (using the value of the Length field representing the length of the DesData field), first set the length of the Length field to 1 byte and set the length of the Mask to 24 bits (because the matrix with the largest number of elements in the multiple matrices contains 24 elements, the length of the Mask is set to 24 bits). The compressed data of Matrix1 after first-level compression is (compress the matrix from left to right, top to bottom) as follows.

$$[6]_{10}+[00100,00001,00110,00011,0000]_2+[8,5,9,10,4,0]_{10}$$

Among them, $[\ ]_{10}$ means that the numbers in [ ] are decimal numbers, and $[\ ]_2$ means that the numbers in [ ] are binary numbers. The 6 in $[6]_{10}$ means that the DesData field contains 6 elements. The last element 0 in the DesData field is the last element in the matrix Matrix1. The corresponding bit in the Mask field is the last bit with a value of 1 (that is, the 20th bit in the Mask field). The last bit with a value of 1 in the Mask field is the 20th bit in the Mask field, indicating that the matrix Matrix1 contains 20 elements.

Assuming that each element in the matrix Matrix1 occupies 1 byte of storage space, before compression, Matrix1 needs 20 bytes of storage space. After first-level compression, the Length field occupies 1 byte of storage space. The Mask field occupies 3 bytes (24 bits) of storage space. The DesData field occupies 6 bytes of storage space. That is, after first-level compression, Matrix1 needs to occupy a total of 10 bytes of storage space. Therefore, in this example, the compression ratio is 10/20. That is, the compression ratio is 1/2.

Please refer now to FIG. 1, FIG. 1 is a schematic diagram of a convolutional neural network 100 in accordance with one embodiment of the present disclosure. As shown in FIG. 1, the convolutional neural network 100 includes a feature extraction stage 120 and a classification stage 130, and the input data 110 comes from outside of the neural network 100. Taking an RGB image as an example, the input data 110 includes three images: the R channel image, the G channel image, and the B channel image of the RGB image. Taking a gray image as an example, the input data 110 only contains one image.

The feature extraction stage 120 includes at least one convolutional layer for feature extraction on the input data 110. The input data 110 is the input data of the first convolutional layer 121 of the feature extraction stage 120. After the first convolution layer 121 performs a convolution operation (that is, a feature extraction operation) on the input data, the output data of the first convolution layer 121 is generated. The output data of the first convolutional layer 121 can be used as the input data of the second convolutional layer 122 (i.e., the next convolutional layer). After the second convolutional layer 122 performs a convolution operation (that is, a feature extraction operation) on the input data, the output data of the second convolutional layer 122 (that is, the input data of the next convolutional layer) is generated. Similarly, the Xth convolutional layer 12X performs a convolution operation on the input data from the previous convolutional layer to generate output data of the Xth convolutional layer 12X. The output data of the Xth convolutional layer 12X is sent to the classification stage 130 for classification processing.

In neural networks, there is an activation layer (not shown) behind many convolutional layers. The activation layer activates the output data of the convolutional layer and then sends it to the next convolutional layer for convolution operation. After the activation process, a large amount of sparse data will appear in the neural network (that is, the data contains a large number of elements with a value of 0). With the first-level compression algorithm disclosed in the present invention, only non-zero elements are stored, so the data storage space required for performing the convolution operation can be greatly reduced. Furthermore, the data appearing in the neural network includes input feature maps, output feature maps and convolution kernels, etc. The input feature map, the area of the input feature map, the output feature map and the area of the output feature map all belong to the matrix mentioned above, and can be compressed using the first-level compression algorithm and the second-level compression algorithm. Before storing a large amount of sparse data appearing in the neural network, by using the first-level compression algorithm proposed in the present disclosure to compress it, a large amount of storage space can be saved and the efficiency of data transmission can be improved.

In another embodiment, there is a pooling layer behind some convolutional layers (or activation layers). The pooling layer performs the pooling processing on the output data of the convolutional layer (or activation layer) and sends it to the next convolutional layer for convolution operation.

The output data of the feature extraction stage 120 will be sent to the classification stage 130 as input data of the classification stage 130 for processing. The classification stage 130 includes multiple fully connected layers (from the first fully connected layer 131 to the Yth fully connected layer 13Y). After receiving the input data (that is, the output data of the feature extraction stage 120), the first fully connected layer 131 to the Yth fully connected layer 13Y sequentially process the received input data in turn. Finally, output data 140 is generated. The output data 140 is data that the neural network 100 outputs to the outside.

After the image in the input data 110 undergoes the convolution operation of the first convolutional layer in the feature extraction stage 120 (i.e., the feature extraction operation), the generated image is called a feature map. The image contained in the input data of each convolutional layer (except the first convolutional layer) is called the input feature map. The image contained in the output data of each convolutional layer is called the output feature map. For the convenience of description, the image in the input data 110 is also referred to as an input feature map in the invention.

Figure 2:
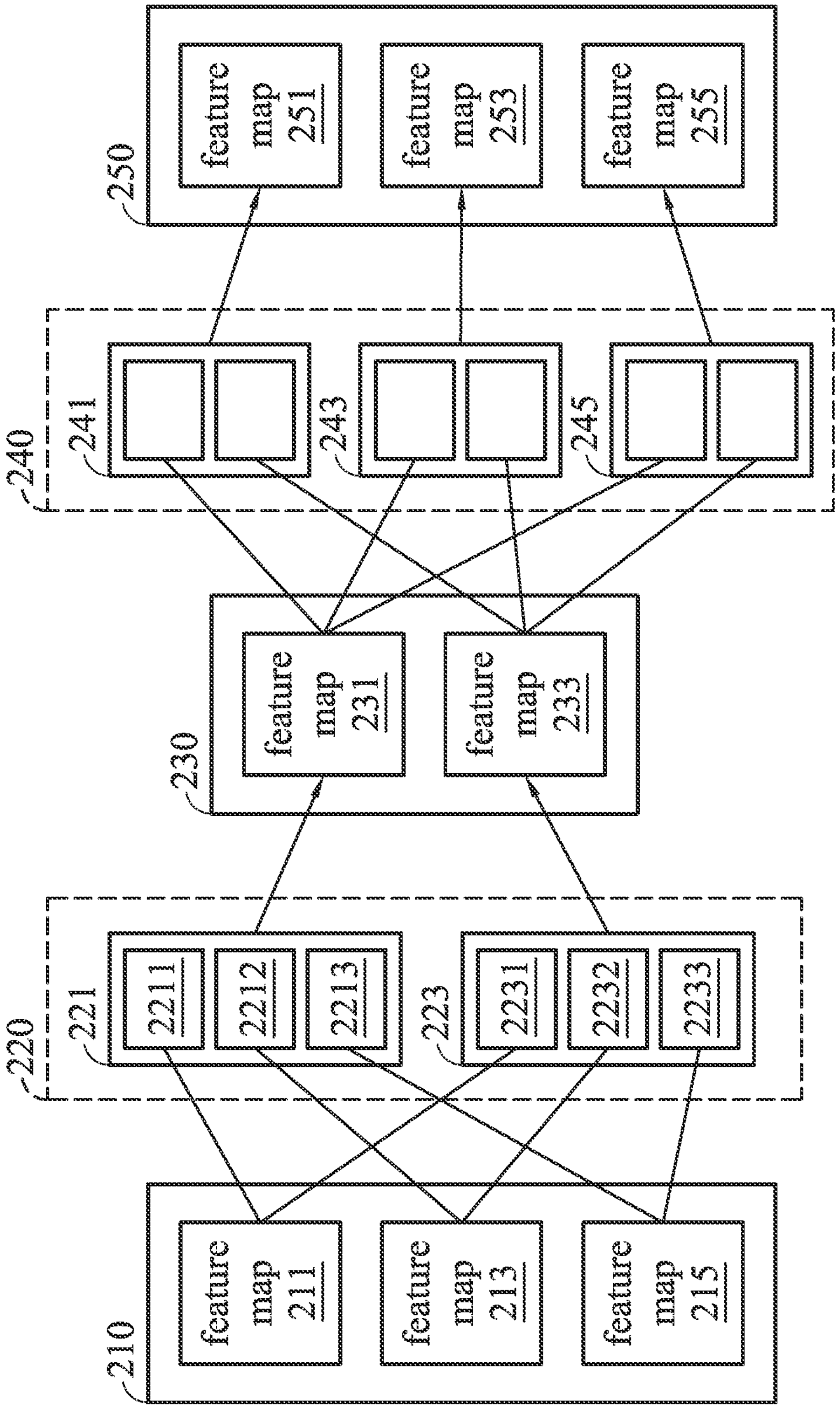
FIG. 2 is a schematic diagram of the convolution operation of the Nth convolutional layer and the N+1th convolutional layer in the convolutional neural network 100 in accordance with one embodiment of the present disclosure.

FIG. 2 is a schematic diagram of the convolution operation of the Nth convolutional layer and the N+1th convolutional layer in the convolutional neural network 100 in accordance with one embodiment of the present disclosure. As shown in FIG. 2, the feature map set 210 is the input data of the Nth convolutional layer of the convolutional neural network 100. The feature map set 230 is the output data of the Nth convolutional layer of the convolutional neural network 100. The feature map set 230 is also the input data of the N+1th convolutional layer of the convolutional neural network 100. The feature map set 250 is the output data of the N+1th convolutional layer of the convolutional neural network 100. The convolution kernel group set 220 is a set of convolution kernel group of the Nth convolution layer of the convolutional neural network 100. The convolution kernel group set 240 is a set of convolution kernel group of the N+1th convolution layer of the convolutional neural network 100.

The feature map set 210 includes feature maps 211, 213, and 215. The feature map set 230 includes feature maps 231 and 233. The convolution kernel group set 220 includes convolution kernel groups 221 and 223. The convolution kernel group 221 includes convolution kernels 2211, 2212, and 2213. In the convolution operation of the Nth convolutional layer, each convolution kernel in the convolution kernel group 221 performs a convolution operation with a corresponding feature map in the feature map set 210 to generate a feature map 231 in the feature map set 230. In detail, the feature map 211 and the convolution kernel 2211 are used to perform a convolution operation to generate a first feature map (not shown). The feature map 213 and the convolution kernel 2212 are used to perform a convolution operation to generate a second feature map (not shown). The feature map 215 and the convolution kernel 2213 are used to perform a convolution operation to generate a third feature map (not shown). Then the values of the pixels in the same position in the first feature map, the second feature map, and the third feature map are added to generate the pixel value at the corresponding position in the feature map 231 (for example, adding the value of the pixel in the first row and the first column of the first feature map, the value of the pixel in the first row and the first column of the second feature map, and the value of the pixel in the first row and the first column of the third feature map, to generate the value of the pixel in the first row and the first column of the feature map 231. Similarly, all pixel values in the feature map 231 can be generated). In the same way, the convolution kernels 2231, 2232, and 2233 in the convolution kernel group 223 are used to perform convolution operations with the corresponding feature maps 211, 213, and 215 in the feature map set 210, and then generate the feature map 233 in the feature map set 230 according to the result of the convolution operation. According to actual application requirements, a pooling layer (not shown) can be added between the Nth convolutional layer and the N+1th convolutional layer, and the generated feature maps 231 and 233 can be pooled and then output. Then the N+1th convolutional layer performs convolution operations on the feature maps 231 and 233 after pooling.

Similar to the convolution operation of the Nth convolutional layer, in the convolution operation of the N+1th layer, the convolution kernel groups 241, 243, and 245 in the convolution kernel group set 240 are used to perform convolution operations with the feature maps 231 and 233 in the feature map set 230 respectively, so as to generate feature maps 251, 253, and 255 in the feature map set 250.

It can be seen from FIG. 2 that the number of input feature maps in each convolution layer is the same as the number of convolution kernels in the convolution kernel group. Each convolution kernel group corresponds to an output feature map. All input feature maps are required to calculate each output feature map. Taking the Nth convolutional layer as an example, when calculating the output feature map 231, all of the convolution kernels in the convolution kernel group 221 and all the input feature maps 211, 213, and 215 in the feature map set 210 need to be used.

Since the width and height of the input data block that the convolution operation device can process in parallel are fixed (for example: 5*4), when using a convolution operation device for convolution operation, if the width or height of the input feature map is larger than the width or height of the input data block that the convolution operation device can process in parallel, the input feature map needs to be divided into multiple input data blocks first. Then the input data block is sent to the convolution operation device for convolution operation to generate the output data block. Finally, the generated output data blocks are sequentially spliced into output feature maps. The following will analyze the various situations when the input feature map is divided into input data blocks in combination with FIGS. 3A-3E (in the example of FIGS. 3A-3E, it is assumed that the convolutional layer for convolution operation contains only one input feature map, one convolution kernel and one output feature map). In the following analysis, it is assumed that the width and height of the input data block that can be processed in parallel by the convolution operation device is 5*4, and it is assumed that the convolution step is 1.

Figure 3A:
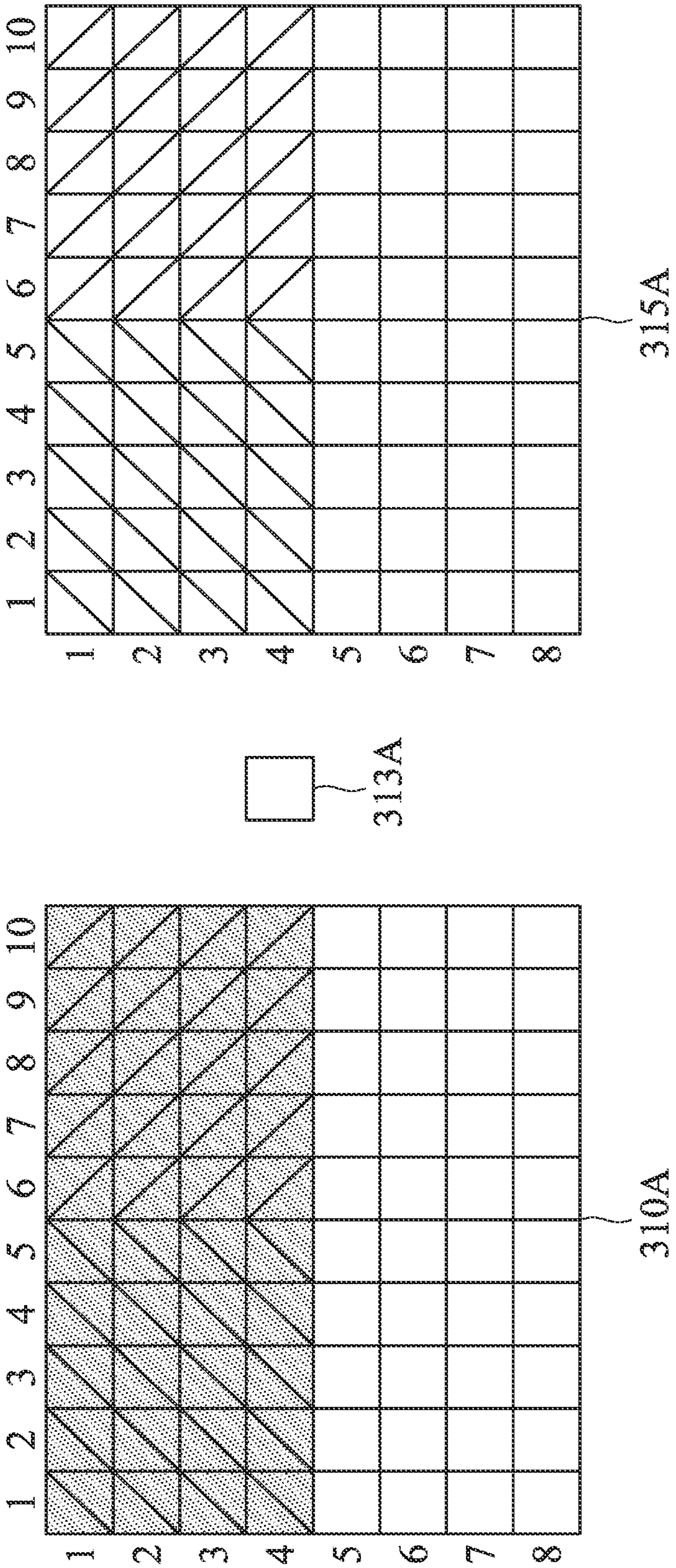
FIG. 3A is a schematic diagram of a block convolution operation when the convolution kernel is 1*1 in accordance with one embodiment of the present disclosure.

Now please refer to FIG. 3A. FIG. 3A is a schematic diagram of a block convolution operation when the convolution kernel is 1*1 in accordance with one embodiment of the present disclosure. As shown in FIG. 3A, 310A is an input feature map, 313A is a convolution kernel, and 315A is an output feature map generated after convolution operation performed on the input feature map 310A with the convolution kernel 313A. Each box in the input feature map 310A and the output feature map 315A represents a feature value (i.e., a pixel value), and each box in the convolution kernel 313A represents a weight value. The size of the input feature map 310A is 10*8. Since the size of the convolution kernel is 1*1, each feature value in the output feature map 315A is a product obtained by multiplying the feature value in the input feature map 310A at the same coordinate and the weight value in the convolution kernel 313A. Therefore, each feature value in the output feature map 315A corresponds to a feature value in the input feature map 310A, that is, the output feature map 315A and the input feature map 310A have the same size, both being 10*8.

As shown in FIG. 3A, when the convolution kernel is 1*1, in order to generate an output data block with the forward slash (i.e., "/", the same below) in the output feature map 315A, it is necessary to use the input data block with the forward slash in the input feature map 310A and the convolution kernel 313A to perform convolution operation. In order to generate the output data block with the backward slash (i.e., "\", the same below) in the output feature map 315A, it is necessary to use the input data block with the backward slash in the input feature map 310A and the convolution kernel 313A to perform convolution operation. Therefore, if the convolution kernel is 1*1, the two input data blocks in the input feature map 310A are also adjacent and non-overlapping when generating two adjacent and non-overlapping output data blocks in the output feature map 315A.

Figure 3B:
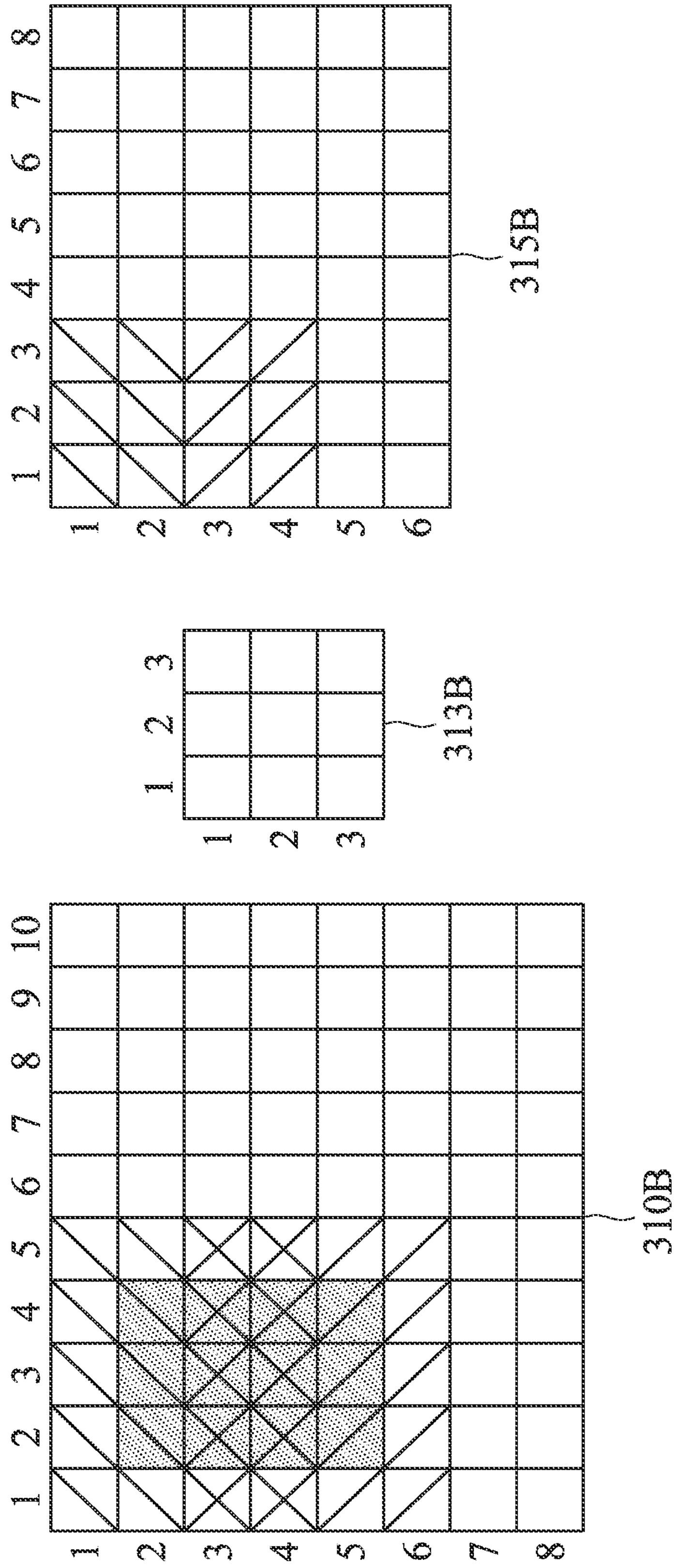
FIG. 3B is a schematic diagram of the overlap of input data blocks in the vertical direction when the convolution kernel is 3*3 when performing convolution operation in accordance with one embodiment of the present disclosure.

Now please refer to FIG. 3B. FIG. 3B is a schematic diagram of the overlap of input data blocks in the vertical direction when the convolution kernel is 3*3 when performing convolution operation in accordance with one embodiment of the present disclosure. As shown in FIG. 3B, 310B is an input feature map, 313B is a convolution kernel, and 315B is an output feature map generated after convolution operation performed on the input feature map 310B with the convolution kernel 313B. The difference from FIG. 3A is that the size of the convolution kernel 313B used in the convolution operation in FIG. 3B is 3*3. As shown in FIG. 3B, when the convolution kernel is 3*3, the output feature map 315B has 2 rows and 2 columns less than the input feature map 310B (the size of the output feature map 315B is 8*6, and the size of the input feature map 310B is 10*8). The convolution operation flow of generating the output feature map 315B is: moving the convolution kernel 313B a box at a time from the upper left corner of the input feature map 310B, in order from left to right, top to bottom (or from top to bottom, from left to right order); performing dot product operation on the weight value in the convolution kernel 313B and the feature value in the 3*3 area overlapping with the convolution kernel 313B in the input feature map 310B in turn, to obtain the feature values corresponding to all the boxes in the output feature map 315B.

FIG. 3B is used to illustrate the overlap of input data blocks in the vertical direction when performing convolution operations. As shown in FIG. 3B, when the convolution kernel is 3*3, in order to generate an output data block with the forward slash in the output feature map 315B (for ease of description, it will be referred to as the upper output data block below), it is necessary to use the input data block with the forward slash and the cross line (i.e., "X", the same below) in the input feature map 310B (for ease of description, it is referred to as the upper input data block below, and the size is 5*4, including the area with the forward slash in rows 1-2 in 310B and the area and the cross line in rows 3-4, that is, it contains the area where the feature values are in the first five columns of each row in rows 1-4 of 310B) to perform convolution operation with the convolution kernel 313B. In order to generate the output data block with the backward slash in the output feature map 315B (for ease of description, it will be referred to as the lower output data block below), it is necessary to use the input data block with the backward slash and the cross line in the input feature map 310B (for the convenience of description, it will be referred to as the lower input data block below, with a size of 5*4, containing the cross line in rows 3-4 and the backward slash in rows 5-6 in 310B, that is, it contains the area where the feature values are in the first five columns of each row in rows 3-6 of 310B) to perform convolution operation with the convolution kernel 313B. As shown in FIG. 3B, there is an overlap area between the upper input data block and the lower input data block in the input feature map 310B, and the overlap area is the area with cross lines in 310B. Specifically, when calculating the feature value located at (2,1) in the output feature map (that is, the feature value located at the lower left corner of the output data block), it is necessary to use the convolution kernel 313B and the feature value of the input feature map 310B located at (2,1), (2,2), (2,3), (3,1), (3,2), (3,3), (4,1), (4,2) and (4,3). When calculating the feature value located at (3, 1) in the output feature map (that is, the feature value located at the upper left corner of the output data block), it is necessary to use the convolution kernel 313B and the feature value of the input feature map 310B located at (3,1), (3, 2), (3, 3), (4, 1), (4, 2), (4,3), (5,1), (5,2) and (5,3). It can be seen that when the feature value located at the lower left corner of the upper output data block and the feature value located at the upper left corner of the lower output data block are calculated, the feature values of the input feature map 310B located at (3,1), (3,2), (3,3), (4,1), (4,2) and (4,3) will be used. Similarly, when the feature value located at the lower right corner of the upper output data block and the feature value located in the upper right corner of the lower output data block are calculated, the feature values of the input feature map 310B located in (3,3), (3,4), (3,5), (4,3), (4,4) and (4,5) will be used. When the feature values in the upper output data block and the feature values in the lower output data block are calculated, the feature values of the input feature map 310B located in (3,1), (3,2), (3,3), (3,4), (3,5), (4,1), (4,2), (4,3), (4,4) and (4,5) will be used, so the area is called the overlap area (i.e., the area with cross lines in 310B). Therefore, if the convolution kernel is 3*3, when generating two adjacent and non-overlapping output data blocks (that is, the upper output data block and the lower output data block) in the output feature map 315B, there is an overlap area of 5*2 between the two input data blocks (that is, the upper input data block and the lower input data block) in the input feature map 310B.

Figure 3C:
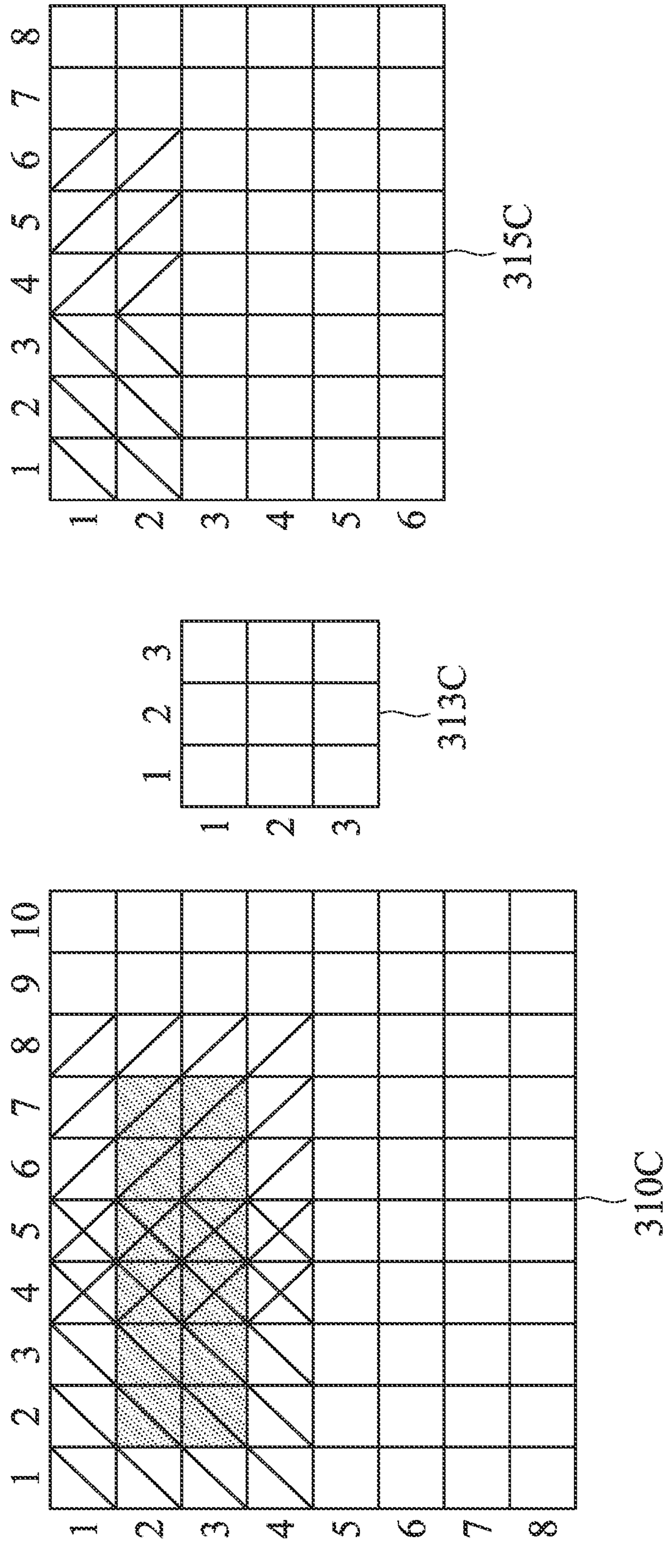
FIG. 3C is a schematic diagram of the overlap of input data blocks in the left and right directions when the convolution kernel is 3*3 when performing a convolution operation in accordance with another embodiment of the present invention.

Now please refer to FIG. 3C. FIG. 3C is a schematic diagram of the overlap of input data blocks in the left-right direction when the convolution kernel is 3*3 when performing a convolution operation in accordance with another embodiment of the present invention. FIG. 3C is used to illustrate the overlap of input data blocks in the left-right direction during convolution operation. As shown in FIG. 3C, when the convolution kernel is 3*3, in order to generate an output data block with forward slash in the output feature map 315C (for ease of description, it will be referred to as the left output data block below), the convolution operation is performed on the input data block with the forward slash and the cross line in the input feature map 310C (for the convenience of description, it will be referred to as the left input data block in the following. Its size is 5*4. It contains the area with forward slash in rows 1-4 and the area with cross line in rows 1-4 of 310C, that is, the area containing the feature values of the first 5 columns of rows 1-4 in 310C) with the convolution kernel 313C. In order to generate an output data block with backward slash in the output feature map 315C (for ease of description, it will be referred to as the right output data block below), the convolution operation is performed on the input data block with the backward slash and the cross line in the input feature map 310C (for the convenience of description, it will be referred to as the right input data block in the following. Its size is 5*4. It contains the area with the backward slash in rows 1-4 of 310C and the area with cross line in rows 1-4, that is, the area containing the feature values of the first 5 columns of rows 1-4 in 310C) with the convolution kernel 313C. As shown in FIG. 3C, there is an overlap area between the left input data block and the right input data block in the input feature map 310C, and the overlap area is the area with cross lines in 310C. Therefore, if the convolution kernel is 3*3, when generating two adjacent and non-overlapping output data blocks (that is, the left output data block and the right output data block) in the output feature map 315C, there is an overlap area of 2*4 between the two input data blocks (i.e., the left input data block and the right input data block) in the feature map 310C.

Figure 3D:
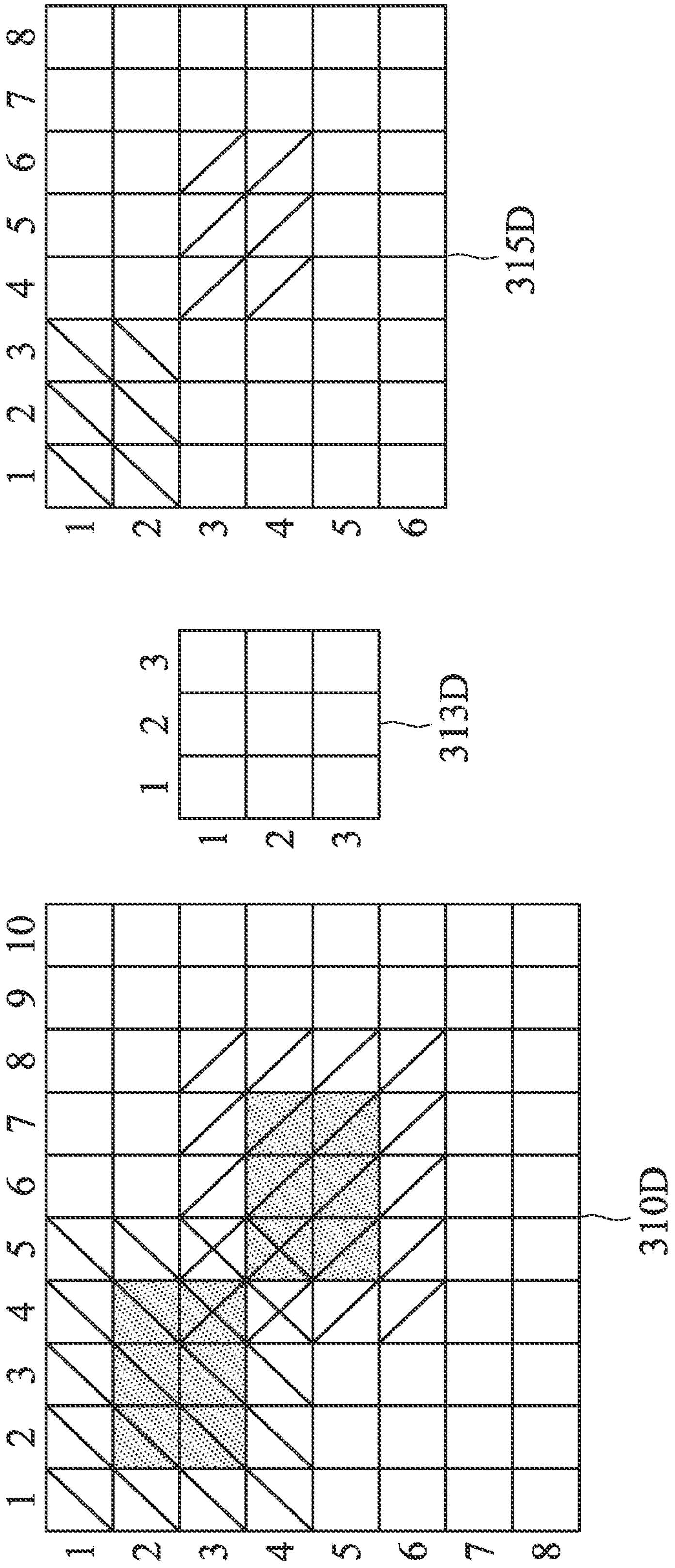
FIG. 3D is a schematic diagram of the overlap of input data blocks in the upper left and lower right directions when the convolution kernel is 3*3 when performing a convolution operation in accordance with another embodiment of the present invention.

Now please refer to FIG. 3D. FIG. 3D is a schematic diagram of the overlap of input data blocks in the upper left-lower right direction when the convolution kernel is 3*3 when performing a convolution operation in accordance with another embodiment of the present invention. FIG. 3D is used to illustrate the overlap of input data blocks in the upper left-lower right direction when performing convolution operations. As shown in FIG. 3D, when the convolution kernel is 3*3, in order to generate the output data block with forward slash in the output feature map 315D (for ease of description, it will be referred to as the upper left output data block below), the convolution operation is performed on the input data block with the forward slash and the cross line in the input feature map 310D (for the sake of description, it will be referred to as the upper left input data block in the following. Its size is 5*4, including the area with the forward slash and the area with the cross line in rows 1-4 of 310D, that is, the area containing the feature values of the first 5 columns of rows 1-4 in 310D) with convolution kernel 313D. In order to generate the output data block with the forward slash in the output feature map 315D (for ease of description, it will be referred to as the lower right output data block below), the convolution operation is performed on the input data block with the backward slash and the cross line in the input feature map 310D (for the convenience of description, it will be referred to as the lower right input data block below, with a size of 5*4, including the area with backward slash and the area with cross lines in the rows 3-6, that is, the area containing the feature values in the 4-8th columns of each row in the 3-6th rows in 310D) with convolution kernel 313D. As shown in FIG. 3D, there is an overlap area between the upper left input data block and the lower right input data block in the input feature map 310D, and the overlap area is the area with cross lines in 310D. Therefore, if the convolution kernel is 3*3, in order to generate two adjacent and non-overlapping output data blocks (i.e., the upper left output data block and the lower right output data block) in the output feature map 315D, there is an overlapping area of 2*2 between the two input data blocks in the input feature map 310D (that is, the upper left input data block and the lower right input data block).

Figure 3E:
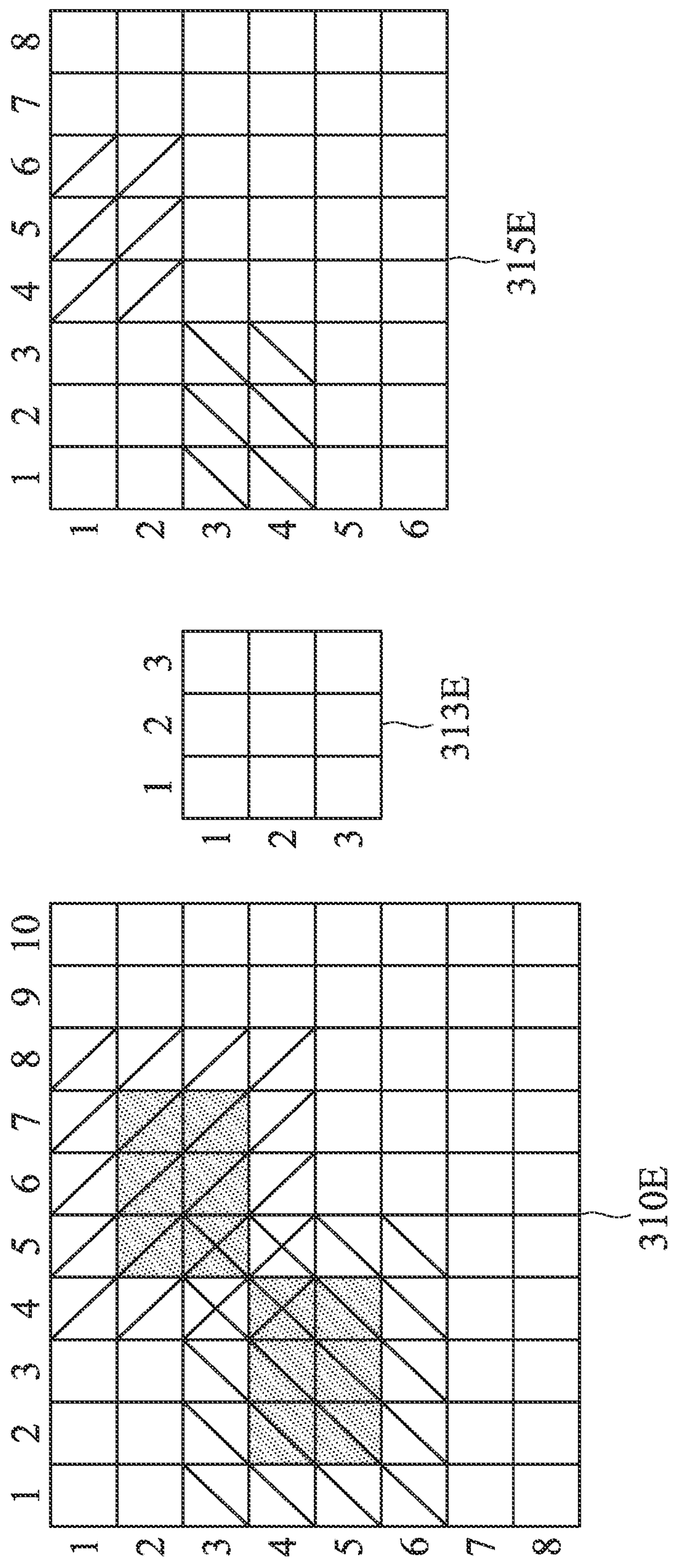
FIG. 3E is a schematic diagram of the overlap of input data blocks in the lower left and upper right directions when the convolution kernel is 3*3 in accordance with another embodiment of the present invention.

Now please refer to FIG. 3E. FIG. 3E is a schematic diagram of the overlap of input data blocks in the lower left-upper right direction when the convolution kernel is 3*3 in accordance with another embodiment of the present invention. FIG. 3E is used to illustrate the overlap of input data blocks in the lower left-upper right direction when performing convolution operations. As shown in FIG. 3E, when the convolution kernel is 3*3, in order to generate an output data block with forward slash in the output feature map 315E (for ease of description, it will be referred to as the lower left output data block below), the convolution operation is performed on the input data block with the forward slash and the cross line in the input feature map 310E (for ease of description, it will be referred to as the lower left input data block below, and its size is 5*4, including the area with forward slash and the area with cross line in rows 1-4 of 310E, that is, the area containing the feature values of the first 5 columns of rows 3-6 in 310E) with convolution kernel 313E. In order to generate the output data block with the backward slash in the output feature map 315E (for ease of description, it will be referred to as the upper right output data block in the following), the convolution operation is performed on the input data block with the backward slash and the cross line in the input feature map 310E (for ease of description, it will be referred to as the upper right input data block below, with a size of 5*4, including the area with backward slash and the area with cross lines in 310E in rows 1-4 of 310E, that is, the area containing the feature values in columns 4-8 of each of rows 1-4 in 310E) with the convolution kernel 313E. As shown in FIG. 3E, there is an overlap area between the lower left input data block and the upper right input data block in the input feature map 310E, and the overlap area is the area with cross lines in 310E. Therefore, if the convolution kernel is 3*3, in order to generate two adjacent and non-overlapping output data blocks (i.e., the lower left output data block and the upper right output data block) in the output feature map 315E, there is an overlapping area of 2*2 between the two input data blocks (i.e., the lower left input data block and the upper right input data block) in the feature map 310E.

Through the analysis of the FIG. 3B-3E, when generating two adjacent and non-overlapping output data blocks in the output feature map, two input data blocks of the input feature maps need to be used, and the two input data blocks have overlapping area. Similarly, when the convolution kernel is 5*5 or 7*7 (or a larger convolution kernel), when generating two adjacent and non-overlapping output data blocks in the output feature map, the two input data blocks in the input feature map that need to be used also have overlapping area. In addition, when the convolution kernel is larger, when two adjacent and non-overlapping output data blocks in the output feature map are generated, the overlap area of the two input data blocks in the input feature map that needs to be used is also larger. When generating two adjacent and non-overlapping output data blocks in the output feature map, the width of the overlapping area of the two input data blocks in the input feature map is the width of the convolution kernel minus the convolution step size of the horizontal direction (when the convolution kernel is 3*3 and the convolution step size of the horizontal direction is 1, the width of the overlapping area is 3 minus 1, which is 2). The height of the overlapping area of the two input data blocks in the input feature map that needs to be used when generating two adjacent and non-overlapping output data blocks in the output feature map is the height of the convolution kernel minus the convolution step size of the vertical direction (when the convolution kernel is 3*3 and the convolution step size of the vertical direction is 1, the width of the overlapping area is 3 minus 1, which is 2).

Figure 4:
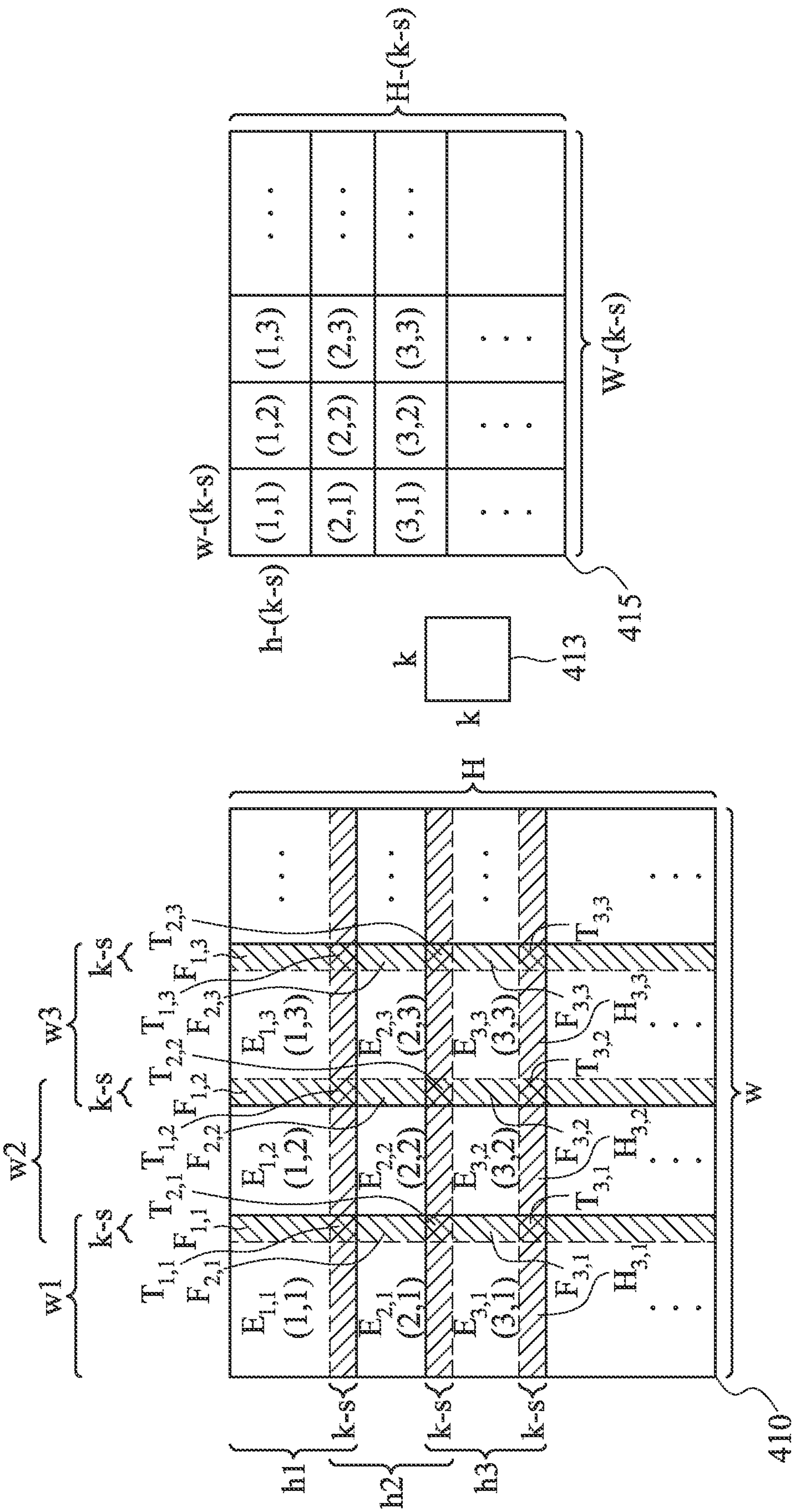
FIG. 4 is a diagram illustrating the case when the convolution kernel is k*k and the convolution step size is s when the convolution operation is performed according to an embodiment of the present invention.

It can be seen from the above that during convolution operation, the input feature map is divided into multiple input data blocks according to the width and height of the input data block that can be processed in parallel by the convolution operation device. Suppose the size of the input data block that the convolution operation device can process in parallel is w*h (w is width and h is height, and w and h are integers greater than 0), and the convolution kernel is k*k (k is greater than 0), the convolution step size is s (s is an integer greater than 0), when k is equal to 1, there is no overlapping area between every two adjacent input data blocks (as shown in FIG. 3A). When k is greater than 1, there is an overlap area between every two adjacent input data blocks, and the output data blocks generated after every two adjacent input data blocks undergo convolution operation are adjacent and non-overlapping (such as the situation shown in FIGS. 3B-3E). Therefore, when the size of the convolution kernel and the convolution step are known, the overlap between all input data blocks in the entire input feature map can be obtained. The block-divided input feature map shown in FIG. 4 contains the overlap between the input data blocks shown in FIGS. 3B-3E. FIG. 4 will be described in detail below.

FIG. 4 is a diagram illustrating the case that the convolution kernel is k*k (k is an integer greater than 0) and the convolution step size is s (s is an integer greater than 0) when the convolution operation is performed, according to an embodiment of the present invention. As shown in FIG. 4, 410 is the input feature map of size W*H (W and H are integers greater than 0), 413 is the convolution kernel of size k*k, and 415 is an output feature map generated after performing a block convolution operation on the input feature map 410. The size of the output feature map 415 is (W−(k−s))*(H−(k−s)), and the size of the output data block in the output feature map 415 is (w−(k−s))*(w−(k−s)). In FIG. 4, w is the width of the input data block (that is, the convolution operation device can process the width of the input data block in parallel), and h is the height of the input data block (the convolution operation device can process the height of the input data block in parallel), k is the side length of the convolution kernel, and s is the convolution step length. The input feature map 410 is divided into multiple input data blocks with overlapping areas, such as input data blocks (1,1), (1,2), (1,3), (2,1), (2,2), (2,3), (3,1), (3,2), (3,3) . . . etc. When k is greater than 1, there is an overlapping area between every two adjacent input data blocks, as shown in FIG. 3B-3E. When the input data block has overlapping areas, these overlapping areas can be further classified. For example, the input data block (1,1) in the input feature map 410 contains 4 areas: non-overlapping area $E_{1,1}$, right vertical overlapping area $F_{1,1}$, lower horizontal overlapping area $H_{1,1}$, and lower right overlapping area $T_{1,1}$. The right vertical overlap area $F_{1,1}$ of the input data block (1,1) is also the left vertical overlap area of the input data block (1,2). The lower horizontal overlap area $H_{1,1}$ of the input data block (1,1) is also the upper horizontal overlap area of the input data block (2,1). The overlap area $T_{1,1}$ in the lower right corner of the input data block (1,1) is also the overlap area in the lower left corner of the input data block (1,2), the overlap area in the upper right corner of the input data block (2,1), and the overlap area in the upper left corner of the input data block (2,2). The input data block (2, 2) contains 9 areas: non-overlapping area $E_{2,2}$, right vertical overlap area $F_{2,2}$, lower horizontal overlap area $H_{2,2}$, lower right corner overlap area $T_{2,2}$, upper left corner overlap area $T_{1,1}$, the upper horizontal overlap area $H_{1,2}$, the upper right corner overlap area $T_{1,2}$, the left vertical overlap area $F_{2,1}$, and the lower left corner overlap area $T_{2,1}$. The overlap area $T_{1,1}$ in the upper left corner of the input data block (2,2) is also the overlap area in the lower right corner of the input data block (1,1). The overlap area $T_{1,1}$ in the upper left corner of the input data block (2,2) is also the overlap area in the lower right corner of the input data block (1,1). The upper horizontal overlap area $H_{1,2}$ of the input data block (2,2) is also the lower horizontal overlap area of the input data block (1,2). The overlap area $T_{1,2}$ in the upper right corner of the input data block (2,2) is also the overlap area in the lower left corner of the input data block (1,3). The left vertical overlap area $F_{2,1}$ of the input data block (2, 2) is also the right vertical overlap area of the input data block (2,1). The right vertical overlap area $F_{2,2}$ of the input data block (2,2) is also the left vertical overlap area of the input data block (2,3). The overlap area $T_{2,1}$ in the lower left corner of the input data block (2,2) is also the overlap area in the upper right corner of the input data block (3,1). The lower horizontal overlap area $H_{2,2}$ of the input data block (2,2) is also the upper horizontal overlap area of the input data block (3,2). The overlap area $T_{2,2}$ in the lower right corner of the input data block (2,2) is also the overlap area in the upper left corner of the input data block (3,3). Obviously, the overlap mode of all input data blocks can be represented through the non-overlapping area $E_{x,y}$, the left (right) vertical overlap area $F_{x,y}$, the upper (lower) horizontal overlap area $H_{x,y}$, and the lower left (upper left/upper right/The lower right) corner overlaps the area $T_{x,y}$, and will not be repeated here.

As shown in FIG. 4, each input data block in the input feature map 410 contains at most 9 regions. However, the input data blocks located in the first row, the first column, the last row, and the last column of the input feature map 410 contain less than 9 regions. In detail, the input data block located in the first row of the input feature map 410 does not include the upper left overlap area, the upper horizontal overlap area, and the upper right overlap area. The input data block located in the first column of the input feature map 410 does not include the upper left Corner overlap area, left vertical overlap area, and lower left corner overlap area. The input data block located in the last row of the input feature map 410 does not include the lower left corner overlap area, the lower horizontal overlap area, and the lower right corner overlap area. The input data block located in the last column of the input feature map 410 does not include the upper right corner overlap area, the right vertical overlap area, and the lower right corner overlap area. For example, the input data block (1,1) contains 4 areas, and the input data block (3,1) contains 6 areas. In order to facilitate the description below, we treat all input data blocks in the input feature map as input data blocks containing 9 regions. For a particular input data block, if it does not contain certain areas, we will treat it as an input data block that contains these areas, and treat the size of these areas as 0*0 (i.e., width and height both are 0). For example, we regard the input data block (3,1) in the input feature map as an input data block with a left vertical overlap area, an upper left overlap area, and a lower right overlap area with a size of 0*0 (that is, the size of the left vertical overlap area is 0*0, the size of the upper left overlap area is 0*0, the size of the lower right overlap area is 0*0).

In another embodiment, the convolution kernel is rectangular, and the width is represented by k1 and the height is represented by k2 (k1 and k2 may be integers greater than 0 and k1 is not equal to k2). The difference from the embodiment in which the convolution kernel is square as shown in FIG. 4 is that the width of the horizontal overlapping area of the input data block (1,1) and (1,2) is k1−s, and the height of the vertical overlapping area of the input data block (1,1) and (2,1) is k2−s. The size of the output feature map 415 is (W−(k1−s))*(H−(k2−s)), and the size of the output data block in the output feature map 415 is (w−(k1−s))*(h−(k2−s)). Other aspects are the same as the embodiment in which the convolution kernel is square.

In another embodiment, when performing the convolution operation, different convolution step lengths can be used in the horizontal and vertical directions. For example, the horizontal convolution step size is s1 and the vertical convolution step size is s2 (s1 and s2 can be an integer greater than 0). The difference from the embodiment shown in FIG. 4 where the horizontal convolution step length and the vertical convolution step length are both s is: the width of the horizontal overlapping area of input data block (1,1) and (1,2) is k−s1, the height of the vertical overlapping area of input data blocks (1,1) and (2,1) is k−s2, the size of the output data block in the output feature map 415 is (w−(k−s1))*(h−(k−s2)). Other aspects are the same as the embodiment in which the horizontal convolution step length and the vertical convolution step length are both s. In another embodiment, the convolution kernel is a rectangle with a width of k1 and a height of k2, and the horizontal and vertical directions are different convolution steps s1 and s2 (k1, k2, s1, and s2 are all integers greater than 0). Therefore, the size of the output data block in the output feature map 415 is (w−(k1−s1))*(h−(k2−s2)).

In the following description of the present disclosure, the input feature map that needs to be divided into blocks for convolution operation (when the width and height of the input feature map are both smaller than the width and height of the input data block that can be processed in parallel by the convolution operation module, the convolution operation module can directly process one input feature map at a time. Therefore, the input feature map does not need to be divided into blocks). All are divided into multiple input data blocks with overlapping areas in the manner shown in FIG. 4. Then the convolution operation is performed on all input data blocks with the convolution kernel, in order from left to right, top to bottom (or top to bottom, left to right) to generate corresponding output data blocks in the output feature map. The generated output data blocks are combined in order from left to right, top to bottom (or top to bottom, left to right) to generate an output feature map.

In addition, in order to facilitate the description of the processing flow of processing the input feature map from left to right and top to bottom in the following paragraphs, we divide each input data block in the input feature map 410 into three parts: horizontal main area, upper horizontal sub-area, and lower horizontal sub-area. In detail, we collectively refer to the non-overlapping area, the left vertical overlapping area, and the right vertical overlapping area of each input data block in the input feature map 410 as the horizontal main area. For example, the horizontal main area of the input data block (1,1) is: $E_{1,1}+F_{1,1}$, the horizontal main area of the input data block (1,2) is: $F_{1,1}+E_{1,2}+F_{1,2}$, and the horizontal main area of the input data block (2, 2) is: $F_{2,1}+E_{2,2}+F_{2,2}$. We collectively refer to the lower left overlapping area, lower horizontal overlapping area, and lower right overlapping area of each input data block in the input feature map 410 as the lower horizontal sub-area. For example, the lower horizontal sub-area of the input data block (1,1) is: $H_{1,1}+T_{1,1}$, and the lower horizontal sub-area of the input data block (1,2) is: $T_{1,1}+H_{1,2}+T_{1,2}$. The lower horizontal sub-area of the input data block (2,2) is: $T_{2,1}+H_{2,2}+T_{2,2}$. We collectively refer to the upper left overlap area, upper horizontal overlap area, and upper right overlap area of each input data block in the input feature map 410 as the upper horizontal sub-area. For example, the upper horizontal sub-region of the input data block (3,1) is: $H_{2,1}+T_{2,1}$, and the upper horizontal sub-area of the input data block (3,2) is: $T_{2,1}+H_{2,2}+T_{2,2}$. The upper horizontal sub-area of the input data block (3,3) is: $T_{2,2}+H_{2,3}+T_{2,3}$. The size of the upper and lower sub-areas of the input data blocks (1,1), (1,2) and (1,3) are all 0*0. We collectively refer to all the lower horizontal overlapping areas and the lower right corner overlapping areas of each row of the input data block in the input feature map 410 as the lower horizontal row overlap areas. For example, the overlapping area of the lower horizontal row of the input data block in row 1 is: $H_{1,1}+T_{1,1}+H_{1,2}+T_{1,2}+H_{1,3}+T_{1,3}+\ldots$. We collectively refer to all the upper horizontal overlap area and the upper right corner overlap area of each row of the input data block in the input feature map 410 as the upper horizontal row overlap area. For example, the overlap area of the upper horizontal row of the input data block in row 3 (also the overlap area of the lower horizontal row of the input data block in row 2) is: $H_{2,1}+T_{2,1}+H_{2,2}+T_{2,2}+H_{2,3}+T_{2,3}+\ldots$. The size of the overlapping area of the upper horizontal row of the input data block in the first row is 0*0.

In the same way, in order to facilitate the description of the processing flow of the input feature map in order from top to bottom and left to right (that is, one row by row processing), the non-overlapping area, the lower horizontal overlapping area and the upper horizontal overlapping area are collectively called the vertical main area. For example, the vertical main area of the input data block (1,1) is: $E_{1,1}+H_{1,1}$, and the vertical main area of the input data block (2,1) is: $H_{1,1}+E_{2,1}+H_{2,1}$. The vertical main area of the input data block (2,2) is: $H_{1,2}+E_{2,2}+H_{2,2}$. We collectively refer to the upper left overlapping area, left vertical overlapping area, and lower left overlapping area of each input data block in the input feature map 410 as the left vertical sub-area. For example, the left vertical sub-area of the input data block (1,3) is: $F_{1,2}+T_{1,2}$, the left vertical sub-area of the input data block (2,3) is: $T_{1,2}+F_{2,2}+T_{2,2}$, and the left vertical sub-area of the input data block (3,3) is: $T_{2,2}+F_{3,2}+T_{3,2}$. We collectively refer to the upper right overlapping area, the right vertical overlapping area, and the lower right overlapping area of each input data block in the input feature map 410 as the right vertical sub-area. For example, the right vertical sub-area of the input data block (1,3) is: $F_{1,3}+T_{1,3}$, the right vertical sub-area of the input data block (2,3) is: $T_{1,3}+F_{2,3}+T_{2,3}$, and the right vertical sub-area of the input data block (3,3) is: $T_{2,3}+F_{3,3}+T_{3,3}$. The size of the left and vertical sub-areas of the input data blocks (1,1), (2,1) and (3,1) are all 0*0. We collectively call the right vertical overlap area and the lower right corner overlap area of each row of input data blocks in the input feature map 410 as the right vertical row overlap area. For example, the overlapping area of the right vertical column of the first column is: $F_{1,1}+T_{1,1}+F_{2,1}+T_{2,1}+F_{3,1}+T_{3,1}+\ldots$. We collectively refer to the left vertical overlap area and the lower left corner overlap area of each row of input data blocks in the input feature map 410 as the left vertical row overlap area. For example, the overlap area of the left vertical column in the third column (also the overlap area of the right vertical column in the second column) is: $F_{1,2}+T_{1,2}+F_{2,2}+T_{2,2}+F_{3,2}+T_{3,2}+\ldots$. For ease of description, in the following paragraphs, the horizontal main area and the vertical main area are called main areas. The lower horizontal sub-area and the right vertical sub-area are called the first sub-area. The overlap area in the lower left corner and the upper right corner of the input data block are called the first overlap sub-area of the first sub-area. The lower horizontal overlap area and the right vertical overlap area of the input data block are called the second overlap sub-area of the first sub-area. The overlap area in the lower right corner of the input data block is called the third overlap area of the first sub-area. The first overlapping sub-area, the second overlapping sub-area and the third overlapping sub-area are called overlapping sub-area. The upper horizontal sub-area and the left vertical sub-area are called the second sub-area; the first and second sub-areas are called the sub-area.

From the input feature map 410 and its related description in FIG. 4, it can be seen that the sub-area of each input data block contains at least one overlapping sub-area. The number of input data blocks adjacent to the overlapping area of the sub-area of the input data block is greater than the number of input data blocks adjacent to the overlapping area of the main area of the input data block.

Figure 5:
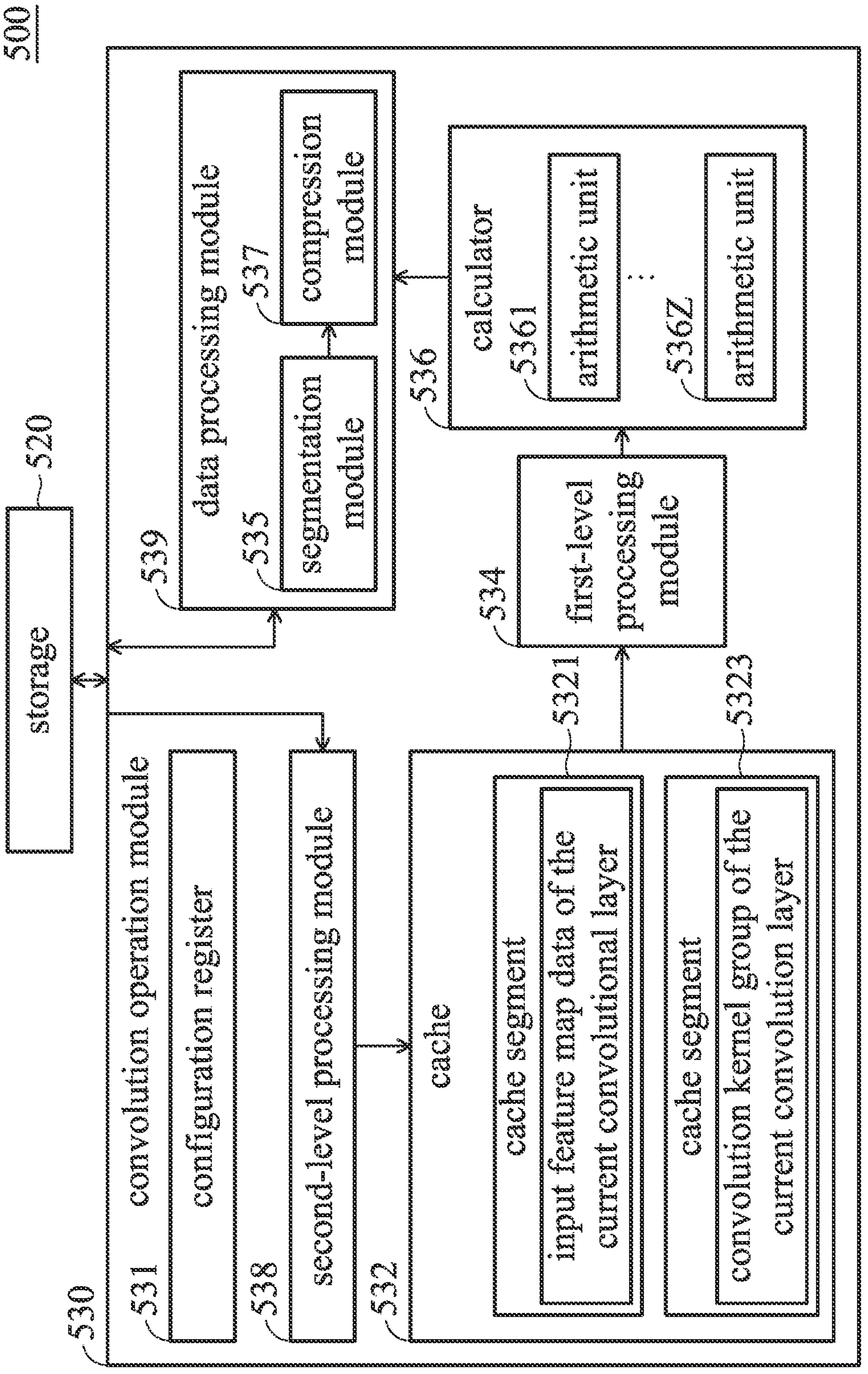
FIG. 5 is a block diagram of a computing device 500 including a convolution operation module 530 in accordance with another embodiment of the present invention.

FIG. 5 is a block diagram of a computing device 500 including a convolution operation module 530 in accordance with another embodiment of the present invention. In one embodiment, the computing device 500 is, for example, a server, a desktop computer, a notebook computer, a mobile phone, a tablet, or other electronic devices with computing functions.

As shown in FIG. 5, the computing device 500 includes a storage 520 and a convolution operation module 530. The storage 520 is coupled to the convolution operation module 530. The convolution operation module 530 can be used to execute the convolution operation of the convolutional layer in a convolutional neural network (for example, the convolutional neural network 100 shown in FIG. 1). The storage 520 is used to store the input feature map set of the current convolution layer in the convolutional neural network, the output feature map set of the current convolution layer, the parameters of each convolution layer, and the convolution kernel group set of each convolution layer. The current convolutional layer refers to the convolutional layer being processed or about to be processed by the convolution operation module 530. In one embodiment, the storage 520 is a system memory. In another embodiment, the storage 520 is a static random access memory (SRAM). In another embodiment, the storage 520 can be a memory used by any computing device 500 to store data.

As shown in FIG. 5, the convolution operation module 530 includes a configuration register 531, a second-level processing module 538, a cache 532, a first-level processing module 534, a calculator 536, and a data processing module 539. The second-level processing module 538 is coupled to the cache 532, and is used to read the input feature map and the convolution kernel from the storage 520, and then decompress the input feature map at the second-level to generate a first-level compressed input feature map, and then store the first-level compressed input feature map and convolution kernel into the cache 532. The first-level processing module 534 is coupled to the cache 532 and the calculator 536, and is used to read the first-level compressed input feature map and the convolution kernel from the cache 532, and decompress the input feature map at the first-level to generate the original input feature map data (i.e., uncompressed data). Then, the input feature map and the convolution kernel are sent to the calculator 536 for convolution operation. The calculator 536 is coupled to the first-level processing module 534 and the data processing module 539, and is used to receive the input feature map and convolution kernel from the first-level processing module 534, and performs a convolution operation on the received input feature map and the convolution kernel to generate an output feature map, then send the output feature map to the data processing module 539. The data processing module 539 includes a segmentation module 535 and a compression module 537. The segmentation module 535 receives the output feature map generated by the calculator 536, and divides the output feature map into multiple output data blocks. Then, the compression module 537 performs two-level compression on the multiple output data blocks and stores them in the storage 520. The configuration register 531 is used to store the parameters of the current convolutional layer (the use of these parameters will be described later). The cache 532 includes a cache segment 5321 and a cache segment 5323. The cache segment 5321 is used to cache the input feature map data of the current convolutional layer. The cache segment 5323 is used to buffer the convolution kernel group of the current convolution layer. The calculator 536 includes multiple arithmetic units (arithmetic units 5361 to 536Z), and each arithmetic unit can perform a convolution operation on an input data block and a convolution kernel to generate an output data block. In the present disclosure, it is assumed that the size of the input data block that can be processed by each arithmetic unit of the calculator 536 is w*h. The following describes the processing flow of the convolution operation module 530 performing the convolution operation of the current convolution layer. The parameters stored in the configuration register 531 include the address of the input feature map set of the current convolutional layer (that is, the first convolutional layer) in the storage 520, the address of the output feature map set of the current convolutional layer in the storage 520, the width and height of the input feature map of the current convolution layer, the address of the convolution kernel group of the current convolution layer in the storage 520, the width and height of the convolution kernel in the convolution kernel group of the current convolution layer, the convolution step size of the current convolution layer, the padding of the current convolution layer, the width and height of the convolution kernel in the convolution kernel group of the next convolution layer, and the padding of the next convolution layer. The width and height of the input feature map of the current convolution layer, the address of the convolution kernel group set of the current convolution layer in the storage 520, the width and height of the convolution kernel in the convolution kernel group of the current convolution layer, and the convolution step of the convolution layer of the current convolution layer, the padding of the current convolution layer, the width and height of the convolution kernel in the convolution kernel group of the next convolution layer, and the padding of the next convolutional layer is read from the storage section 525 of the storage 520.

First, the second-level processing module 538 reads the input feature map of the current convolutional layer from the storage 520 according to the parameters in the configuration register 531 (the input feature map stored in the storage 520 is two-level compressed. The processing flow of two-level compression of the input feature map stored in the storage 520 will be described in detail later), and the second-level decompression will be performed on the input feature map of the current convolutional layer to obtain the first-level compressed data. Then, the first-level compressed data of the input feature map of the current convolutional layer is stored in the cache segment 5321 of the cache 532. On the other hand, the second-level processing module 538 also reads the convolution kernel group of the current convolution layer from the storage 520 according to the parameters in the configuration register 531, and stores it in the cache segment 5323 of the cache 532.

Then, the first-level processing module 534 reads the first-level compressed data of the input feature map of the current convolutional layer from the cache segment 5321, and performs a first-level decompression on it (see the foregoing for the first-level compressed data format) to obtain the input feature map of the current convolutional layer. The first-level processing module 534 also reads the convolution kernel group corresponding to the input feature map of the current convolution layer from the cache segment 5323. Then the first-level processing module 534 sends the input feature map of the current convolution layer and the convolution kernel in the corresponding convolution kernel group to the calculator 536 for convolution operation.

Then, the calculator 536 will assign the input feature map of the current convolution layer and the corresponding convolution kernel to the idle arithmetic unit to perform convolution operation according to the parameters in the configuration register 531 to generate an output feature map. The calculator 536 sends the generated output feature map to the data processing module 539.

Finally, the data processing module 539 performs two-level compression on the received output feature map according to the parameters in the configuration register 531 (the processing flow of the two-level compression will be detailed later), and then writes it into the storage 520. The output feature map of the current convolutional layer will be used as the input feature map of the next convolutional layer to participate in the convolution operation of the next convolutional layer. Since the input feature map of the first convolutional layer is the original input data of the convolution operation, before the computing device 500 performs the convolution operation, it needs to be two-level compressed and stored in the storage 520. In an embodiment, the convolution operation module 530 also provides a decompression/compression interface externally. Through this decompression/compression interface, modules located outside the convolution operation module 530 can call the data processing module 539 for compression operations, or call the second-level processing module 538 and/or the first-level processing module 534 for decompression operations. At this time, the data processing module 539, the second-level processing module 538, and the first-level processing module 534 are simply called. The computing device 500 can store the input feature map of the first convolutional layer into the storage 520 after performing two-level compression through the decompression/compression interface provided by the convolution operation module 530.

In another embodiment, the second-level processing module 538, the cache 532, the first-level processing module 534, the calculator 536, and the data processing module 539 can be implemented in a pipeline to increase the processing speed of the convolution operation module 530.

As mentioned above, in the process of convolution operation, many elements with value 0 will be generated in the input feature map/output feature map. Therefore, the compression ratio of data required for the convolution operation is very high. The space required for storing data in the cache 532 will be greatly reduced. In addition, since there are many layers of convolution operation, the two-level compression of the present invention will effectively compress the input feature map/output feature map of each convolution layer, so the amount of data transmission between the convolution operation module 530 and the storage 520 is greatly reduced (because of the two-level compression), thereby improving the overall computing efficiency of the computing device 500. In addition, when the input feature map is sent to the convolution operation module 530 for processing, the calculator 536 cannot process compressed data (only can process the original data of the input feature map). Therefore, the first-level compressed data of the input feature map is stored in the cache 532, and the input feature map is decompressed by the first-level decompression module 534 before sent to the calculator 536 for processing.

Figure 6A:
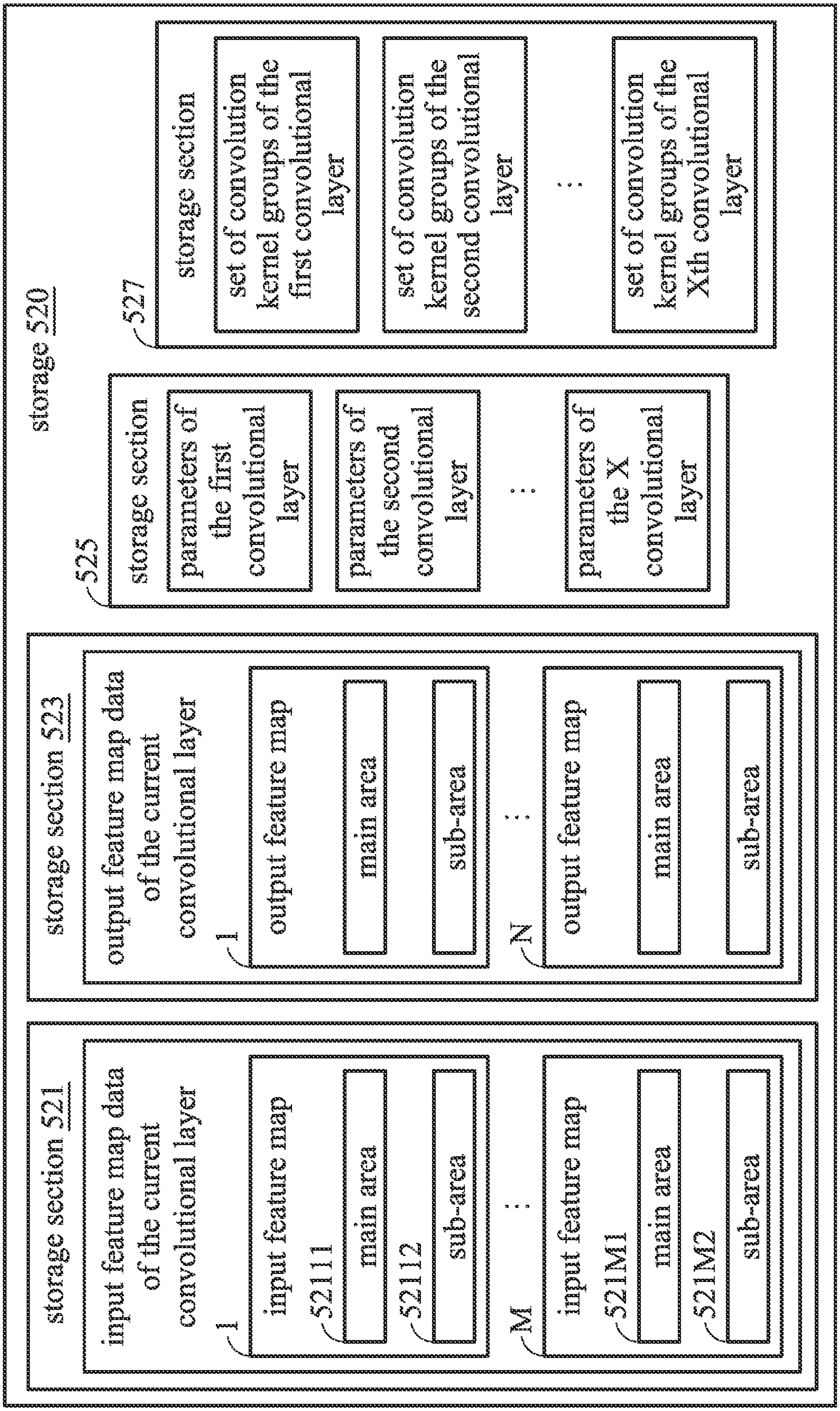
FIG. 6A is a schematic diagram of data stored in the storage 520 of the computing device 500 in accordance with another embodiment of the present invention.
Figure 6B:
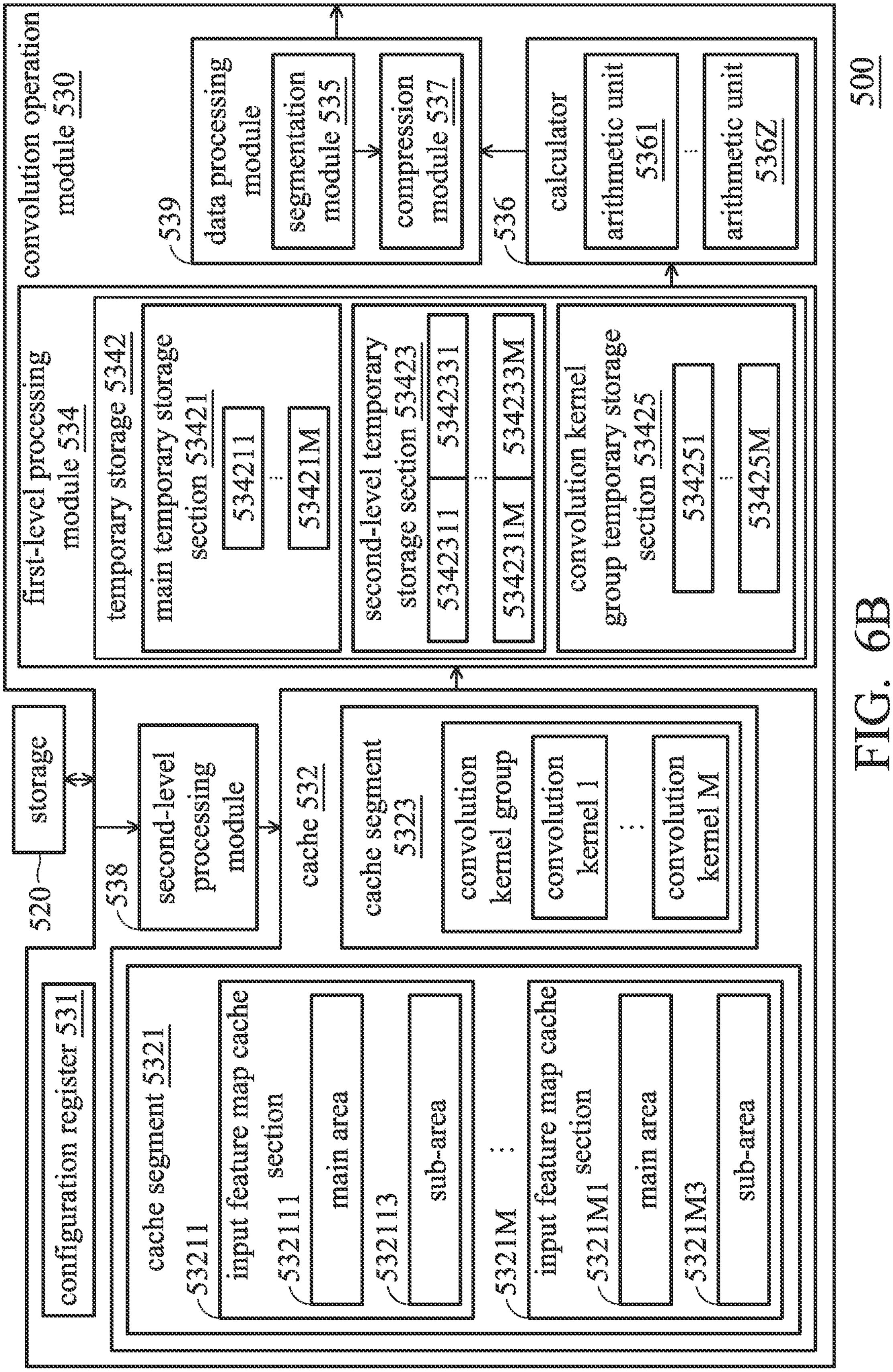
FIG. 6B is a more detailed block diagram of the computing device 500 in accordance with another embodiment of the present invention.
Figure 6C:
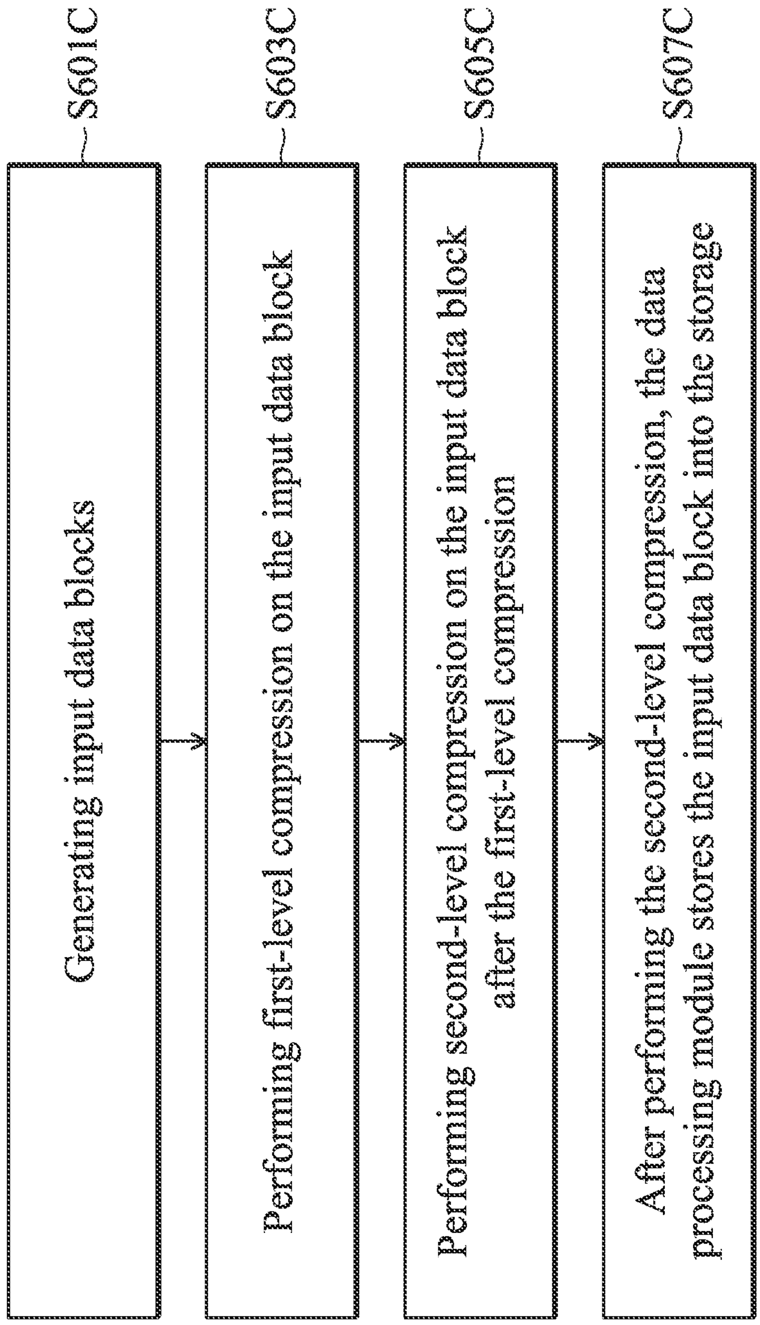
FIG. 6C is a processing flow chart of performing two-level compression on the input feature map of the Nth convolutional layer and then writing it into the storage in accordance with another embodiment of the present invention.
Figure 6D:
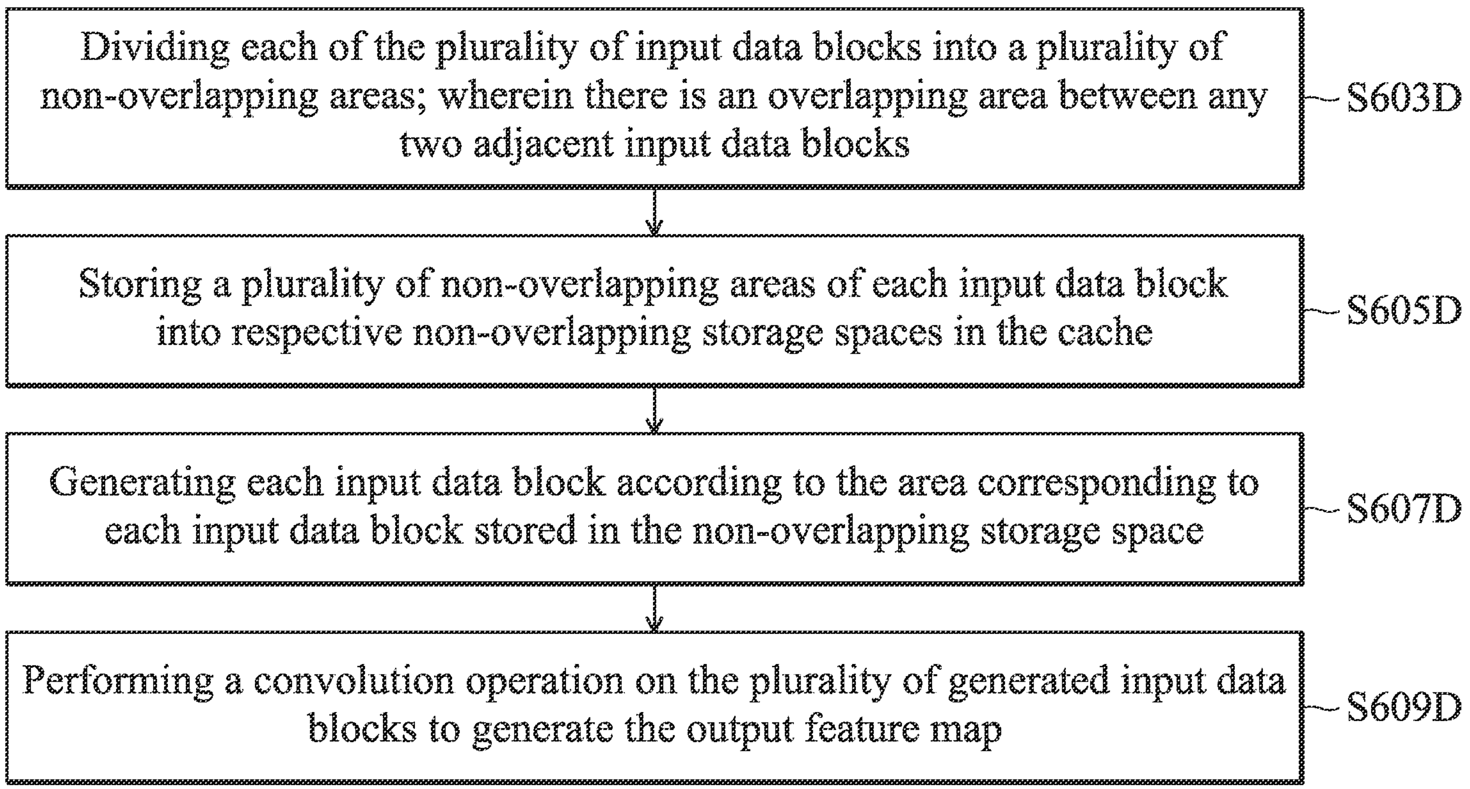
FIG. 6D is a processing flow of generating an output feature map using the computing device 500 in accordance with another embodiment of the present invention.
Figure 6E:
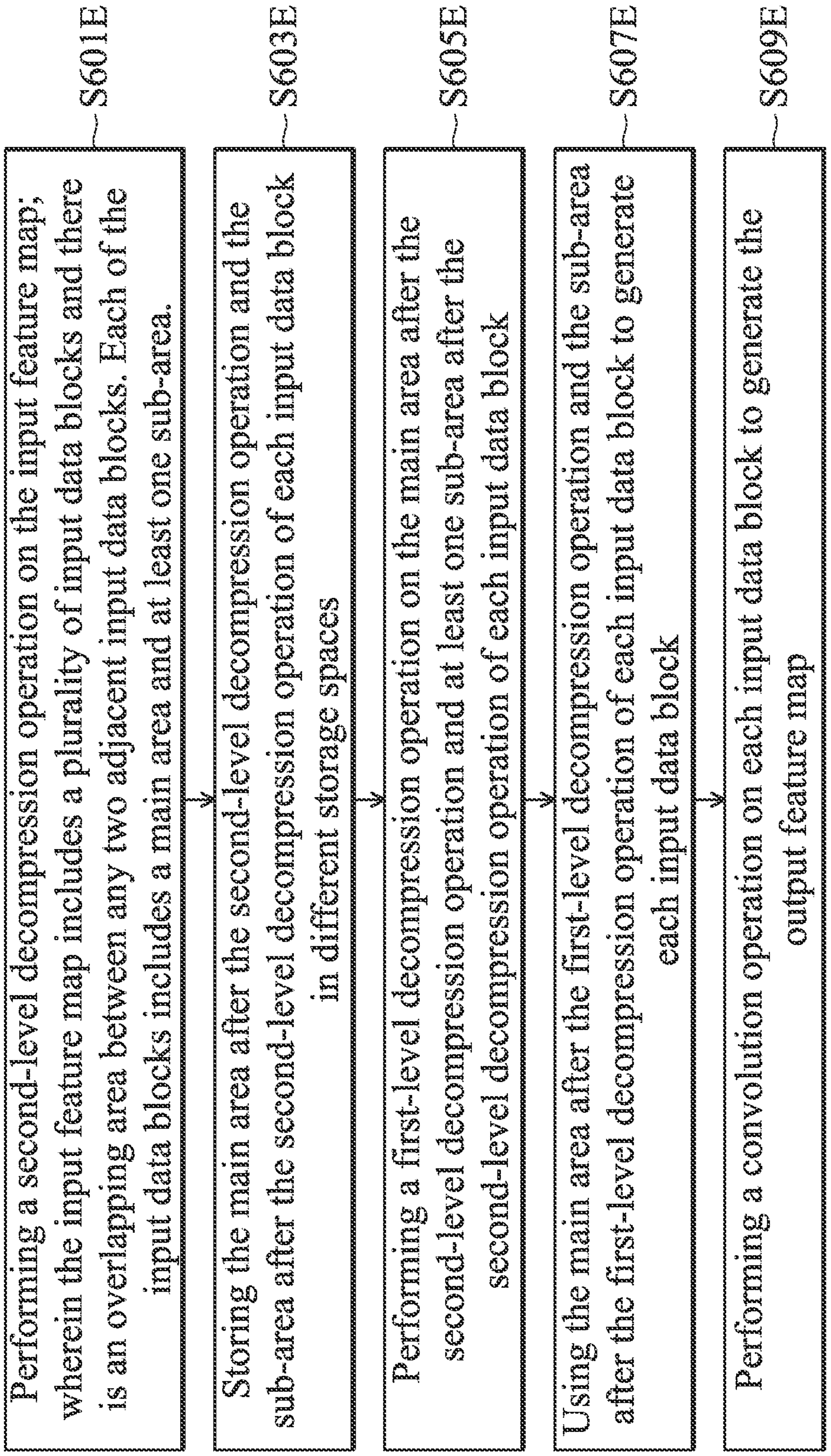
FIG. 6E is a processing flow of generating an output feature map via the computing device 500 in accordance with another embodiment of the present invention.
Figures 1, 6F:
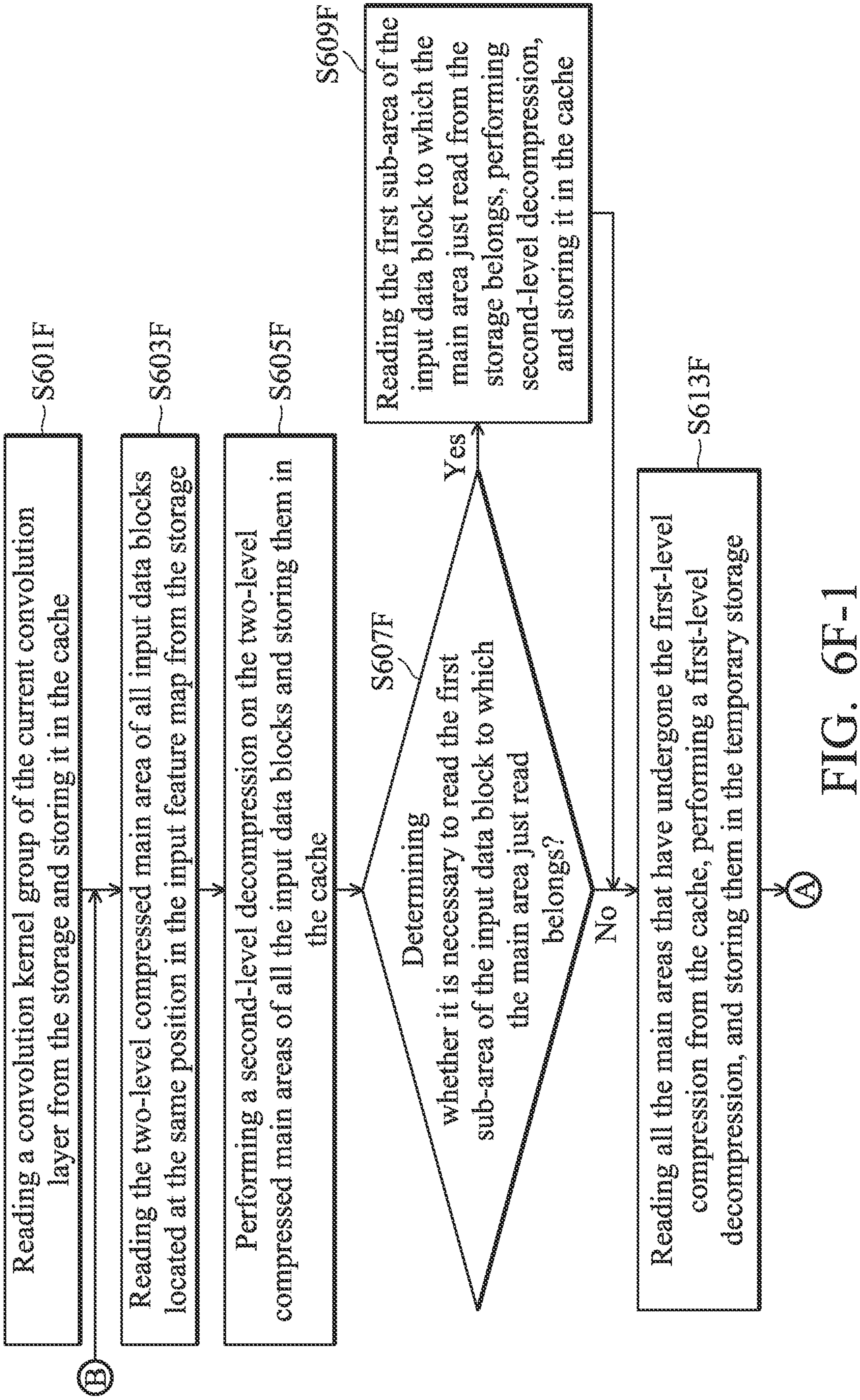
Figures 2, 6F:
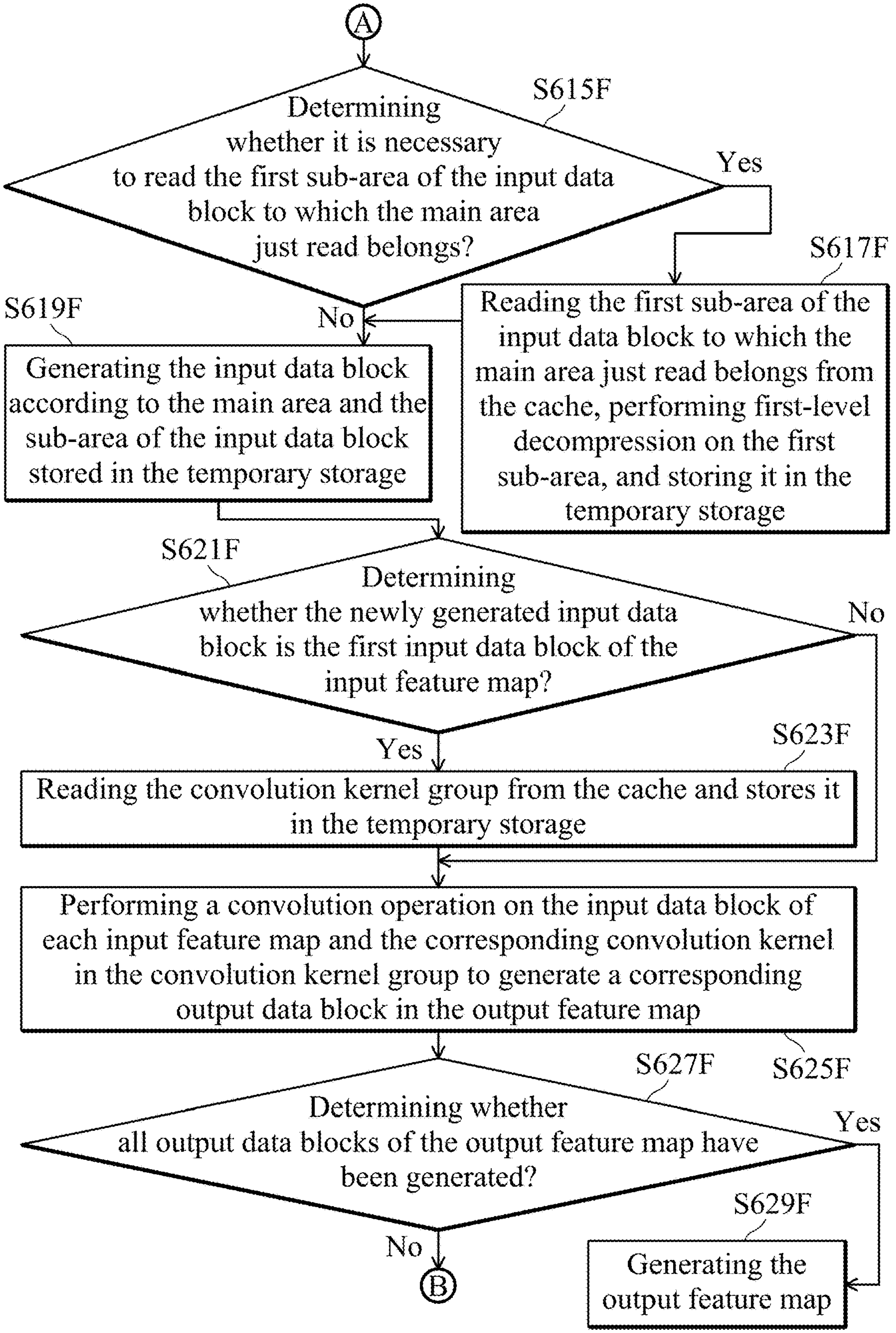

FIG. 6A is a schematic diagram of data stored in the storage 520 of the computing device 500 in accordance with another embodiment of the present invention. FIG. 6B is a more detailed block diagram of the computing device 500 in accordance with another embodiment of the present invention. FIG. 6C is a processing flow chart of performing two-level compression on the input feature map of the Nth convolutional layer and then writing it into the storage in accordance with another embodiment of the present invention. FIG. 6D is a processing flow of generating an output feature map via the computing device 500 in accordance with another embodiment of the present invention. FIG. 6E is a processing flow of generating an output feature map using the computing device 500 in accordance with another embodiment of the present invention. FIGS. 6F-1 to 6F-2 are a more detailed processing flow chart of the computing device 500 generating an output feature map in accordance with another embodiment of the present invention. Hereinafter, the processing flow of using the convolution operation device 500 to run the convolutional neural network will be described in detail in conjunction with FIGS. 6A, 6B, 6C, 6D, 6E, and 6F-1 to 6F-2.

As shown in FIG. 6A, the storage 520 includes storage sections 521, 523, 525, and 527. The storage 520 is used to store the data used for executing the convolutional neural network. For example, the storage section 521 is used to store the input feature map set of the current convolutional layer. The storage section 523 is used to store the output feature map set of the current convolutional layer (before performing the convolution operation of the current convolutional layer, the number of output feature maps stored in the storage section 523 is 0). The storage section 525 is used to store the parameters of all convolutional layers. The storage section 527 is used to store the set of convolution kernel group of all convolution layers. The storage section 525 is used to store parameters related to each convolutional layer. For example, the parameters related to the first convolutional layer include: the width and height of the input feature map of the first convolutional layer, the address of the convolution kernel group set of the first convolutional layer in the storage 520, and the width and height of the convolution kernel in the convolution kernel group of the first convolution layer, the convolution step of the first convolutional layer, and the padding of the first convolutional layer. The parameters of other convolutional layers in the storage section 525 are similar to the parameters of the first convolutional layer, and will not be repeated here. It is worth noting that before the start of the convolution operation, the parameters and convolution kernel group set related to each convolution layer will be stored in the storage section 525 and storage section 527, and will not change during the convolution operation.

Before using the computing device 500 to execute the convolutional neural network, the data needed to be processed needs to be stored in the storage 520 first. In detail, the computing device 500 writes the parameters of the first to X convolutional layers into the storage section 525, writes the set of convolution kernel group of the first to X convolutional layers into the storage section 527, and the input feature map set of the first convolutional layer is written into the storage section 521 after two-level compression according to the processing flow chart in FIG. 6C. At this time, since the first convolution operation has not yet started, the output feature map of the first convolution layer has not been generated yet, so any output feature map has not been stored in the storage section 523. It is worth noting that only the input feature map set of the first convolution layer is written into the storage 520 by the computing device 500 by calling the compression interface provided by the convolution operation module 530. The input feature map set of other convolutional layers are all the output feature map sets of the previous convolutional layer, which are received by the data processing module 539 and directly subjected to two-level compression before being stored in the storage 520. For example, the output feature map set of the first convolutional layer is the input feature map set of the second convolutional layer, and the output feature map set of the first convolutional layer is written into the storage section 523 by the data processing module 539 (after two-level compression). The data processing module 539 writes the output feature map set of the current convolutional layer into the storage section 523 through the processing flow chart of FIG. 6C. The processing flow chart of two-level compression of all input feature maps of the Nth convolutional layer and then writing into the storage will be described in detail below in conjunction with FIG. 6C.

As shown in FIG. 6C, in step S601C, the segmentation module 535 generates input data blocks. In detail, the segmentation module 535 in the data processing module 539 divides all input feature maps of the Nth convolutional layer into input data blocks with overlapping regions (using the division method shown in FIG. 4) that can be processed in parallel by the convolution operation device 530, based on the width and height of the input data block, the width and height of the convolution kernel of the Nth convolution layer, the convolution step of the Nth convolution layer (these parameters can be obtained from the configuration register 531). Then step S603C is executed.

In step S603C, the compression module 537 performs first-level compression on the input data block. In detail, the compression module 537 in the data processing module 539 will perform first-level compression on the main area (for example, when the input data block is processed in order from left to right and top to bottom, the main area of the input data block (2,2) is $F_{2,1}+E_{2,2}+F_{2,2}$; when the input data block is processed in order from top to bottom and left to right, the main area of the input data block (2,2) is $H_{1,2}+E_{2,2}+H_{2,2}$) and the sub-area (for example, when the input data block is processed in order from left to right and top to bottom, the first sub-area of the input data block (2,2) is: $T_{2,1}+H_{2,2}+T_{2,2}$; when the input data block is processed in order from top to bottom and left to right, the first sub-area of input data block (2,2) is $T_{1,2}+F_{2,2}+T_{2,2}$) of each input data block of the feature map, to generate the main area and sub-area with first-level compression. In another embodiment, when the input data blocks are processed in order from left to right and top to bottom, the first sub-area of all input data blocks located on the same row (such as all input data blocks on the second row is $H_{2,1}+T_{2,1}+H_{2,2}+T_{2,2}+H_{2,3}+T_{2,3}+\ldots$. It is worth noting that the first sub-area of all input data blocks on the first row is $H_{1,1}+T_{1,1}+H_{1,2}+T_{1,2}+H_{1,3}+T_{1,3}+\ldots$ At the same time, it is also the second sub-area of all input data blocks on the second row) is treated as a whole for first-level compression. Similarly, when the input data blocks are processed in order from top to bottom and left to right, the first sub-area of all input data blocks on the same column (for example, the first sub-area of all input data blocks on the second row is $F_{1,2}+T_{1,2}+F_{2,2}+T_{2,2}+F_{3,2}+T_{3,2}+\ldots$. It is worth noting that the first sub-area $F_{1,1}+T_{1,1}+F_{2,1}+T_{2,1}+F_{3,1}+T_{3,1}+\ldots$ of all input data blocks on the first row is also the second sub-area on the second row of the input data block) is treated as a whole for first-level compression. Then step S605C is executed.

In step S605C, the compression module 537 performs second-level compression on the input data block after the first-level compression. In detail, the compression module 537 in the data processing module 539 will use the main area region and the sub-area region of each input data block of the input feature map that have undergone first-level compression to perform second-level compression respectively to generate main area and sub-area compressed regions undergone second-level compression. In another embodiment, the main area regions (for example, 5) of multiple adjacent input data blocks in the same input feature map may be treated as a whole for performing the second-level compression as a whole (for example, connected together in sequence). Then step S607C is executed.

In step S607C, after performing the second-level compression, the data processing module 539 stores the input data block into the storage 520. In detail, the data processing module 539 stores the main area and sub-area with second-level compression of each input data block of the input feature map into the storage section 521 (for example, the input feature map of the first convolutional layer is stored in the storage section 521) or the storage section 523 (for example, the input feature map of the second convolutional layer is stored in the storage section 523, that is, the output feature map of the first convolutional layer is stored in the storage section 523) of the storage 520.

Now we return to FIG. 6A. As shown in FIG. 6A, before the convolution operation of the current convolutional layer, all input feature maps of the current convolutional layer (input feature map 1 to input feature map M) are sequentially stored in the storage section 521. The main areas of the input feature map are stored first, and then the sub-areas of the input feature map are stored. For example, when storing the input feature map 1, all the main areas of the input feature map 1 are stored in the main area 52111 of the input feature map 1 of the storage section 521 in order from left to right and top to bottom. Then, all the sub-areas of the input feature map 1 are stored in sub-area 52112 of the input feature map 1 in order from left to right and top to bottom. Take storing the input feature map 410 in FIG. 4 (assuming that the input feature map 410 is the input feature map 1) as an example, when storing the input feature map 410, the main area $E_{1,1}+F_{1,1}$ of the input data block (1,1) of the input feature map 410, and the main area $F_{1,1}+E_{1,2}+F_{1,2}$ of the input data block (1,2) of the input feature map 410, . . . etc. are stored into the main area 52111 of the input feature map 1 of the storage section 521 in sequence. Then, the first sub-area of the input data block in the first row of the input feature map 410, the first sub-area of the input data block in the second row of the input feature map 410, etc., are stored into the sub-area 52112 of the input feature map 1 in sequence. The way of storing the output feature map in the storage section 523 is the same as the way of storing the input feature map in the storage section 521, and will not be repeated here.

In another embodiment, when storing the input feature map (or output feature map) into the storage section 521 (or the storage section 523), the first sub-area is stored first, and then the main area is stored after the first sub-area.

After the input feature map set of the first convolutional layer with two-level compression is written into the storage 520, the computing device 500 first writes the parameters of the first convolutional layer into the configuration register 531. Then, the convolution operation module 530 is notified to start the convolution operation on the first convolution layer.

After receiving the notification to start the convolution operation, the computing device 500 will use the processing flow chart in FIG. 6D or FIG. 6E (detailed later) to perform a convolution operation on the input feature map set of the first convolution layer with each convolution kernel group to generate an output feature map corresponding to each convolution kernel group. The following first describes the processing flow chart of convolving the input feature map set with a convolution kernel group in FIG. 6D to generate an output feature map. The computing device 500 first executes step S603D.

In step S603D, each of the plurality of input data blocks is divided into a plurality of non-overlapping areas. There is an overlapping area between any two adjacent input data blocks. In detail, the input feature map is divided into a plurality of input data blocks. There is an overlapping area between any two adjacent input data blocks. According to the overlapping area between the input data blocks, each input data block is divided into a plurality of non-overlapping areas. Specifically, the computing device 500 uses the processing flow chart in step S601C in FIG. 6C described above to divide the input feature map into multiple input data blocks with overlapping areas. Then the computing device 500 divides each input data block into a plurality of non-overlapping areas according to the overlapping area between the input data blocks, that is, divides each input data block into a main area, a first sub-area and the second sub-area. As shown in FIG. 4, when the input feature map is processed in order from left to right and top to bottom, the input data block (2, 2) is divided into main area $(F_{2,1}+E_{2,2}+F_{2,2})$, first sub-area $(T_{2,1}+H_{2,2}+T_{2,2})$ and second sub-area $(T_{1,1}+H_{1,2}+T_{1,2})$. The input data block (1,2) is divided into the main area $(F_{1,1}+E_{1,2}+F_{1,2})$, the first sub-area (that is, the second sub-area of the input data block (2,2), $T_{1,1}+H_{1,2}+T_{1,2}$). Input data block (2,2) is adjacent to input data block (1,2). And, there is an overlapping area $T_{1,1}+H_{1,2}+T_{1,2}$ between the input data blocks (2,2) and (1,2). When the input feature map is processed in order from top to bottom and left to right, the input data block (2,2) is divided into the main area $(H_{1,2}+E_{2,2}+H_{2,2})$, the first sub-area $(T_{1,2}+F_{2,2}+T_{2,2})$ and second sub-area $(T_{1,1}+F_{2,1}+T_{2,1})$. The input data block (2,1) is divided into the main area $(H_{1,1}+E_{2,1}+H_{2,1})$, the first sub-area (that is, the second sub-area of the input data block (2,2), $T_{1,1}+F_{2,1}+T_{2,1}$). Input data block (2,1) is adjacent to input data block (2,2). And, there is an overlap area $T_{1,1}+F_{2,1}+T_{2,1}$ between the input data blocks (2,1) and (2,2). Then, according to steps S603C, S605C, and S607C in FIG. 6C, the computing device 500 performs two-level compression on the areas of each input data block of the input feature map, and then stores them into the storage 520. Then step S605D is executed.

In step S605D, the computing device 500 stores a plurality of non-overlapping areas of each input data block into respective non-overlapping storage spaces in the cache. In detail, the computing device 500 reads the area of the input data block that has undergone two-level compression from the storage 520, performs the second-level decompression, and stores it in the cache 532. For a more detailed flow, please refer to the description of steps S603F, S605F, S607F, and S609F in FIGS. 6F-1 to 6F-2 of FIG. 6F later. Then step S607D is executed.

In step S607D, the computing device 500 generates each input data block according to the area corresponding to each input data block stored in the non-overlapping storage space. In detail, the computing device 500 generates the corresponding input data block according to the first-level compressed area of the input data block stored in the cache 532. For a more detailed flow, please refer to the description of steps S613F, S615F, S617F and S619F in FIGS. 6F-1 to 6F-2 of FIG. 6F later. Then, step S609D is performed.

In step S609D, the computing device 500 performs a convolution operation on the plurality of generated input data blocks to generate the output feature map. In detail, the computing device 500 sends the input data block to the calculator 536 for convolution operation to generate an output data block, and then the output data block is spliced into an output feature map. For a more detailed flow, please refer to the description of steps S621F, S623F, S625F, S627F, and S629F in FIGS. 6F-1 to 6F-2 of FIG. 6F.

From the above description of FIG. 6C and FIG. 6D, it can be seen that the input data block stored in the storage 520 is data that has been compressed with the first-level compression method and then compressed with the second-level compression method. The input data block stored in the cache 532 is data that has been compressed with the first-level compression method. The compression ratio of the input data block stored in the storage 520 is higher than the compression ratio of the input data block stored in the cache 532. Therefore, when the convolution operation module 530 loads data from the external storage 520, or when the convolution operation module 530 transmits data to the storage 520 for storage, the amount of transmission data and the transmission time required can be greatly reduced. Therefore, the execution efficiency of the system is improved.

The following describes the processing flow chart of convolving the input feature map set and a convolution kernel group to generate an output feature map in FIG. 6E. The computing device 500 first executes step S601E.

In step S601E, the computing device 500 performs a second-level decompression operation on the input feature map. The input feature map includes a plurality of input data blocks and there is an overlapping area between any two adjacent input data blocks. Each of the input data blocks includes a main area and at least one sub-area. In detail, reads the input data block areas of the input feature map from the storage 520. Then the computing device 500 performs a second-level decompression operation on the input data block areas. For a more detailed process, refer to the description of steps S603F, S605F, S607F, and S609F in FIGS. 6F-1 to 6F-2 are as below. Then, step S603E is performed.

In step S603E, the computing device 500 stores the main area after the second-level decompression operation and the sub-area after the second-level decompression operation of each input data block in different storage spaces. In detail, the computing device 500 stores the main area after the second-level decompression operation and at least one sub-area after the second-level decompression operation of each input data block into different storage spaces in the cache 532 respectively. For a more detailed flow, please refer to the description of steps S603F, S605F, S607F, and S609F in FIGS. 6F-1 to 6F-2 of FIG. 6F later. Then step S605E is executed.

In step S605E, the computing device 500 performs a first-level decompression operation on the main area after the second-level decompression operation and at least one sub-area after the second-level decompression operation of each input data block. In detail, the computing device 500 reads the main area and the sub-area of the input data block from the cache 532. The computing device 500 performs a first-level decompression operation on the main area and sub-area that have undergone first-level compression and stores them in the temporary storage 5342. For a more detailed process, refer to the description of the step S613F in FIGS. 6F-1 to 6F-2 below. Then step S607E is executed.

In step S607E, the computing device 500 uses the main area after the first-level decompression operation and the sub-area after the first-level decompression operation of each input data block to generate each input data block. In detail, the computing device 500 reads the main area and the sub-area of the input data block after the first-level decompression operation from the temporary storage 5342 to generate the input data block. For a more detailed flow, please refer to the description of step S619F in FIGS. 6F-1 to 6F-2 later. Then step S609E is executed.

In step S609E, the computing device 500 performs a convolution operation on each input data block to generate the output feature map. In detail, the computing device 500 sends the input data block to the calculator 536 for convolution operation to generate an output data block, and then the output data block is spliced into an output feature map. For more detailed flow, please refer to the description of steps S621F, S623F, S625F, S627F and S629F in FIGS. 6F-1 to 6F-2 below.

The following describes a more detailed processing flow chart of the convolution operation of the input feature map set with a convolution kernel group in FIGS. 6F-1 to 6F-2 to generate an output feature map. The convolution operation module 530 first executes step S601F.

In step S601F, the second-level processing module 538 reads a convolution kernel group of the current convolution layer from the storage 520 and stores it in the cache 532. In detail, the second-level processing module 538 reads a convolution kernel group that has not been processed yet of the current convolutional layer from the storage section 527 of the storage 520 according to the address of the convolution kernel group set of the current convolutional layer stored in the configuration register 531 in the storage 520. The second-level processing module 538 stores the convolution kernel group in the cache segment 5323 of the cache 532. According to the description of FIG. 2 of the present disclosure, each convolution kernel group may include multiple convolution kernels (for example, the convolution kernel 1 to the convolution kernel M shown in the cache segment 5323). Then step S603F is executed.

In step S603F, the second-level processing module 538 reads the two-level compressed main area of all input data blocks located at the same position in the input feature map from the storage 520 (for example, the two-level compressed main area of the input data block (1,1) in all input feature maps; when the input data block is processed in order from left to right and top to bottom, the main area refers to the horizontal main area; when processing the input data blocks in order from top to bottom and left to right, the main area refers to the vertical main area; the same below). In detail, the second-level processing module 538 reads each input feature map that is located at the same location in a two-level compressed main area from the storage section 521 of the storage 520 according to the address in the storage 520 of all the input feature maps of the current convolutional layer stored in the configuration register 531. For example, as shown in FIG. 6A, the second-level processing module 538 reads the main area 52111 of the input data block (1,1) of the input feature map 1 of the current convolutional layer in the storage segment 521, until the two-level compressed main area 521M1 of the input data block (1,1) of the input feature map M. Therefore, the two-level processing module 538 can read a total of M main areas belonging to different input feature maps. In another embodiment, the second-level processing module 538 can read a portion (for example, 5) of the two-level compressed input data block of each input feature map at a time. Then step S605F is executed.

In step S605F, the second-level processing module 538 performs a second-level decompression on the two-level compressed main areas of all the input data blocks and stores them in the cache 532. In detail, the second-level processing module 538 performs second-level decompression on the two-level compressed main areas of all read input data blocks, and generates the first-level compressed main areas of all input data blocks. Then, the second-level processing module 538 stores the first-level compressed main areas of all input data blocks into the cache segment 5321 of the cache 532. For example, the second-level processing module 538 stores the first-level compressed data generated after the second-level decompression of the input feature map stored in the storage section 521 of the storage section 521 of the storage 520 into the input feature map cache section 53211 of the main cache segment 532111, and so on, until the first-level compressed data generated after the second-level decompression of the main area 521M1 of the input feature map M that has undergone the second-level compression is stored in the main cache segment 5321M1 of the input feature map cache segment 5321M. Then step S607F is executed.

In step S607F, the convolution operation device 530 determines whether it is necessary to read the first sub-area of the input data block to which the main area just read belongs. In detail, in the first embodiment, the second-level processing module 538 only reads the first sub-area of one input data block at a time. As shown in the input feature map 410 in FIG. 4, when the input data block of the input feature map is processed in order from left to right and top to bottom, if the input data block is located in the last row of the input feature map, it is determined that the result is "No"; if the input data block is not located in the last line of the input feature map, the result is "Yes". Similarly, when the input data blocks of the input feature map are processed in order from top to bottom and from left to right, if the input data block is located in the last row of the input feature map, the determined result is "No"; if the input data block is not in the last column of the input feature map, the determined result is "Yes". In the second embodiment, the second-level processing module 538 reads the first sub-area of all input data blocks in the same column (or row) as the read input data block each time. As shown in the input feature map 410 in FIG. 4, when the input data blocks of the input feature map are processed in order from left to right and top to bottom, if the main area (that is, the horizontal main area) belongs to the input data block which is located in the first column, indicating that the convolution operation device 530 has just begun to process a new line of input data block, so it is necessary to read the first sub-area of the input data block (i.e. the lower horizontal row overlap area), so the determined result is "Yes"; however, if the input data block to which the main area belongs to the input data block which is located in the last row, since the input data block located in the last row does not have the first sub-area, there is no need to read the first sub-area, so the determined result is "No"; if the input data block to which the main area (i.e., horizontal main area) belongs is not located in the first column or the last row, because the first sub-area of the input data block is already read when the data block in the same row and the first column is processed, so there is no need to read it again, the determined result is "No". Similarly, when the input data blocks of the input feature map are processed in order from top to bottom and from left to right, if the input data block to which the main area (i.e., the vertical main area) belongs to the first row, it shows that the convolution operation device 530 has just started to process a new row of input data blocks, so the first sub-area of the input data block (that is, the overlapping area of the right vertical row) needs to be read, so the determined result is "Yes". However, if the input data block to which the main area belongs to the last row, since the input data block in the last row does not have the first sub-area, there is no need to read the first sub-area, so the determined result is "No". If the input data block to which the main area (i.e., the vertical main area) belongs to is not located in the first row or the last column, because the first sub-area of the input data block is already read when the data block in the same row and the first row is processed, so there is no need to read it again, so the determined result is "No". In step S607F, if the determined result is "No", step S613F is executed. If the determined result is "Yes", step S609F is executed. First, step S609F is described.

In step S609F, the second-level processing module 538 reads the first sub-area of the input data block to which the main area just read from the storage 520 belongs, performs second-level decompression, and stores it in the cache 532. In detail, the second-level processing module 538 reads the first sub-area of the input data block from the storage section 521 of the storage 520 according to the position of the input data block to which the main area just read from the storage 520 belongs. In the first embodiment, the second-level processing module 538 only reads and the first sub-area of the input data block itself. For example, as shown in FIG. 4, when the input data block is processed in order from left to right and top to bottom, the first sub-area of the input data block (2,2) of the input feature map 410 is $T_{2,1}+H_{2,2}+T_{2,2}$; when the input data block is processed in order from top to bottom and left to right, the first sub-area of the input data block (2,2) of the input feature map 410 is $T_{1,2}+F_{2,2}+T_{2,2}$. In the second embodiment, the second-level processing module 538 reads the first sub-area of all input data blocks that are located in the same row (or column) as the input data block. For example, as shown in FIG. 4, when the input data blocks are processed in order from left to right and top to bottom, the first sub-area of all input data blocks that are located in the same row as the input data block (1,1) of the input feature map 410 (that is, the overlapping area of the lower horizontal row of the input data block) is: $H_{1,1}+T_{1,1}+H_{1,2}+T_{1,2}+H_{1,3}+T_{1,3}+\ldots$ . When the input data blocks are processed in order from top to bottom and from left to right, the first sub-area of all input data blocks that are in the same row as the input data block (1,1) of the input feature map 410 (that is, the overlap area of the right vertical column of the input data block) is: $F_{1,1}+T_{1,1}+F_{2,1}+T_{2,1}+H_{3,1}+T_{3,1}+\ldots$ . Then, the second-level processing module 538 performs the second-level decompression on the first sub-areas, generates each first sub-area that has been first-level compressed, and stores each first sub-area that has been first-level compressed into the sub-area 532113 of the input feature map cache section 53211, and so on, until the sub-area 5321M3 of the input feature map cache section 532M1. Then, step S613F is executed.

Since the storage 520 is located outside the convolution operation module 530, the speed at which the convolution operation module 530 reads the data of the input feature map of the current convolution layer will be affected by the data transmission bandwidth between the storage 520 and the convolution operation module 530. By storing the two-level compressed input feature map data in the storage 520, the amount of data that needs to be transmitted between the storage 520 and the convolution operation module 530 is reduced, the data transmission efficiency is improved. Therefore, the efficiency of convolution operation performed by the convolution operation module 530 is improved. At the same time, since the input feature map data stored in the cache 532 of the convolution operation module 530 has been first-level compressed, instead of the uncompressed original data, more input feature map data can be stored in the cache 532, so that the convolution operation module 530 can perform convolution operations on convolutional layers with more input feature maps.

In step S607F, when the convolution operation device 530 determines whether it is necessary to read the first sub-area of the input data block to which the main area just read belongs to, and the result is "No", step S613F is executed.

In step S613F, the first-level processing module 534 reads all the main areas that have undergone the first-level compression from the cache, performs a first-level decompression, and stores them in the temporary storage 5342. In detail, the first-level processing module 534 reads all the main areas that have undergone the first-level compression from the main area 532111 of the input feature map cache section 53211 to the main area 5321M1 of the input feature map cache section 5321M. The first-level processing module 534 performs first-level decompression on each main area, and then stores them into the sub-temporary storage sections 534211 to 53421M of the main temporary storage section 53421, and then deletes all the main areas stored in the cache 532. Then, step S615F is executed.

In step S615F, the computing device 500 determines whether it is necessary to read the first sub-area of the input data block to which the main area just read belongs. The specific determining method is similar to step S607F, and will not be repeated here. When the determined result is "No", step S619F is executed. When the determined result is "Yes", step S617F is executed. Step S617F is described below.

In step S617F, the first-level processing module 534 reads the first sub-area of the input data block to which the main area just read belongs from the cache 532, performs first-level decompression on the first sub-area, and stores it in the temporary storage 5342. In detail, the first-level processing module 534 reads each first-level compressed sub-area (532113-5321M3) from each input feature map cache section (53211-5321M) of the cache segment 5321 of the cache 532. After each first-level compressed area is first-level decompressed, it is stored in the sub-temporary sections 5342311 to 534231M (or sub-temporary sections 5342331 to 534233M) of the second-level temporary storage section 53423 of the temporary storage 5342. Then, the storage space occupied by the first sub-area in the cache 532 is released. As shown in the input feature map 410 in FIG. 4, when the input data block is processed in order from left to right and top to bottom, in order to generate the input data block of the first row, only the first sub-area corresponding to the input data block in first row is required. However, in order to generate the input data block of the second row, in addition to the first sub-area corresponding to the input data block of the second row, a first sub-area corresponding to the input data block of the first row is required (that is, the second sub-area of the input data block in the second row). After the input data block of the second row is generated, when the input data block of third row is being generated, the first sub-area corresponding to the input data block of first row is not needed. For example, as shown in FIG. 4, in order to generate the input data block of the first row of the input feature map 410, only the first sub-area corresponding to all the input data blocks of the first row (i.e., the lower horizontal row overlap area) $H_{1,1}+T_{1,1}+H_{1,2}+T_{1,2}+H_{1,3}+T_{1,3}$ . . . are needed. In order to generate the input data block in the second row of the input feature map 410, except for the first sub-area (i.e., the lower horizontal row overlap area) $H_{2,1}+T_{2,1}+H_{2,2}+T_{2,2}+H_{2,3}+T_{2,3}$ . . . , the first sub-area corresponding to all input data blocks in first row (that is, the second sub-area of all input data blocks in second row) $H_{1,1}+T_{1,1}+H_{1,2}+T_{1,2}+H_{1,3}+T_{1,3}$ . . . are also needed. After the input data block in the second row of the input feature map 410 is generated, when the input data block in the third row is being generated, the first sub-area $H_{1,1}+T_{1,1}+H_{1,2}+T_{1,2}+H_{1,3}+T_{1,3}$ . . . of all input data blocks in the first row are not needed. Therefore, when generating input data blocks of all rows, it is necessary to save two sub-areas (i.e., the first sub-area and the second sub-area) of each input data block of each input feature map of the current convolution layer in the second-level temporary storage section 53423 of the temporary storage 5342 at the same time. Each time before the first-level processing module 534 writes a new first sub-area in the temporary storage 5342, it needs to determine which group of lower horizontal row overlap area stored in the second-level temporary storage section 53423 (i.e., stored in sub-temporary sections 5342311 to 534231M or sub-temporary sections 5342331 to 534233M) has been used up. If the determined result is that it is used up, then the new lower horizontal row overlap area is used to replace it. For example, as shown in FIG. 4, when the first input data block (3,1) in third row of the input feature map 410 is generated, the first sub-area $H_{1,1}+T_{1,1}+H_{1,2}+T_{1,2}+H_{1,3}+T_{1,3}$ corresponding to all input data blocks in the first row has been used up. When the input data blocks are processed in order from top to bottom and left to right, the processing method is similar to that when the input data blocks are processed in order from left to right and top to bottom, so we will not repeat them here. Then, step S619F is executed.

In step S619F, the first-level processing module 534 generates the input data block according to the main area and the sub-area of the input data block stored in the temporary storage 5342. In detail, first, the first-level processing module 534 can calculate starting position of the first sub-area and second sub-area of the input data block in the second-level temporary storage section 53423 of the temporary storage 5342 according to the number of columns of the input data block to which the main area stored in the temporary storage 5342 belongs. Taking the input feature map 410 in FIG. 4 as an example, the starting position of the first sub-area $T_{3,1}+H_{3,3}+T_{3,3}$ and the second sub-area $T_{2,2}+H_{2,3}+T_{2,3}$ of the input data block (3,3) in the second-level temporary storage section 53423 of the temporary storage 5342 is 2*(w−(ks)) (or 2*(w−(hs))).

Then, the first-level processing module 534 can obtain the information of the first sub-area and second sub-area from the second-level temporary storage section 53423 according to the starting position of the first sub-area and second sub-area of the input data block in the second-level temporary storage section 53423 of the temporary storage 5342.

Finally, the first-level processing module 534 merges the main area, the first sub-area and the second sub-area of the input data block to generate an input data block. Then, step S621F is executed.

In step S621F, the first-level processing module 534 determines whether the newly generated input data block is the first input data block of the input feature map. If "No", step S625F is executed. If "yes", step S623F is executed. Step S623F will be described first.

In step S623F, the first-level processing module 534 reads the convolution kernel group from the cache 532 and stores it in the temporary storage 5342. In detail, the first-level processing module 534 reads the convolution kernel group (including convolution kernel 1-M) from the cache section 5323 of the cache 532, and stores the convolution kernel group in the sub-temporary sections 534251-53425M of the convolution kernel group temporary storage section 53425 of the temporary storage 5342. Then, step S625F is executed.

In step S625F, the convolution operation module 530 performs a convolution operation on the input data block of each input feature map and the corresponding convolution kernel in the convolution kernel group to generate a corresponding output data block in the output feature map. In detail, the first-level processing module 534 sends all input data blocks of the input feature map and corresponding convolution kernels in the convolution kernel group (one input data block corresponds to one convolution kernel) to the calculator 536. The calculator 536 sends all the received input data blocks and the corresponding convolution kernels to the idle calculator 5361-536Z for convolution operation (for the detailed flow of the convolution operation, please refer to the description of FIG. 2 above), so as to generate the corresponding output data block in the output feature map. The calculator 536 sends the generated output data block to the data processing module 539. Then, step S627F is executed.

In step S627F, the convolution operation module 530 determines whether all output data blocks of the output feature map have been generated. If "No", the convolution operation module 530 will perform steps S603F-S627F again to generate the next output data block of the output feature map. If "yes", step S629F is executed.

In step S629F, the convolution operation module 530 generates the output feature map. In detail, after the output feature map is generated, the data processing module 539 compresses the generated output feature map twice and stores it in the storage 520 through the processing flow chart shown in FIG. 6C.

By re-executing the processing flow charts shown in FIGS. 6F-1 to 6F-2, the next output feature map of the current convolution layer can be generated, until all output feature maps of the current convolutional layer are generated. After all output feature maps of the current convolutional layers are generated, the convolution operation module 530 will notify the computing device 500 (for example, in an interrupted manner). Then the computing device 500 writes the parameters of the next convolutional layer into the configuration register 531, and informs the convolution operation module 530 to start the calculation of the next convolutional layer, until the calculation of the entire neural network is completed.

Figure 7:
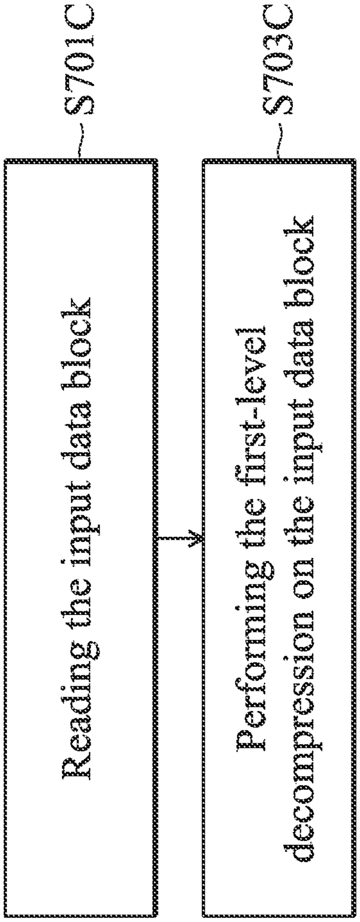
FIG. 7 is a processing flow chart of decompressing input data blocks using the computing device 500 in accordance with another embodiment of the present invention.

FIG. 7 is a processing flow chart of decompressing input data blocks using the computing device 500 in accordance with another embodiment of the present invention. As shown in FIG. 7, the computing device 500 first reads the input data block (step S701), and then performs the first-level decompression on the input data block (step S703). Step S701 is executed first.

In step S701, the first-level processing module 534 reads the input data block. For the detailed process, please refer to the description of step S613F in FIGS. 6F-1 to 6F-2 above. Then, step S703 is executed.

In step S703, the first-level processing module 534 performs first-level decompression on the input data block. For the detailed process, please refer to the description of steps S613F-S617F in FIGS. 6F-1 to 6F-2 above. As for steps S619F-S627F, they describes generating input data blocks from the main areas and sub-areas after the first-level decompression, performing convolution operation, and generating output data blocks, which will not be repeated here.

In another embodiment, when the buffer space of the cache 532 of the convolution operation device 530 is relatively sufficient, the second-level processing module 538 can read more main areas of the input data block at a time to speed up the convolution operation speed.

Figure 8:
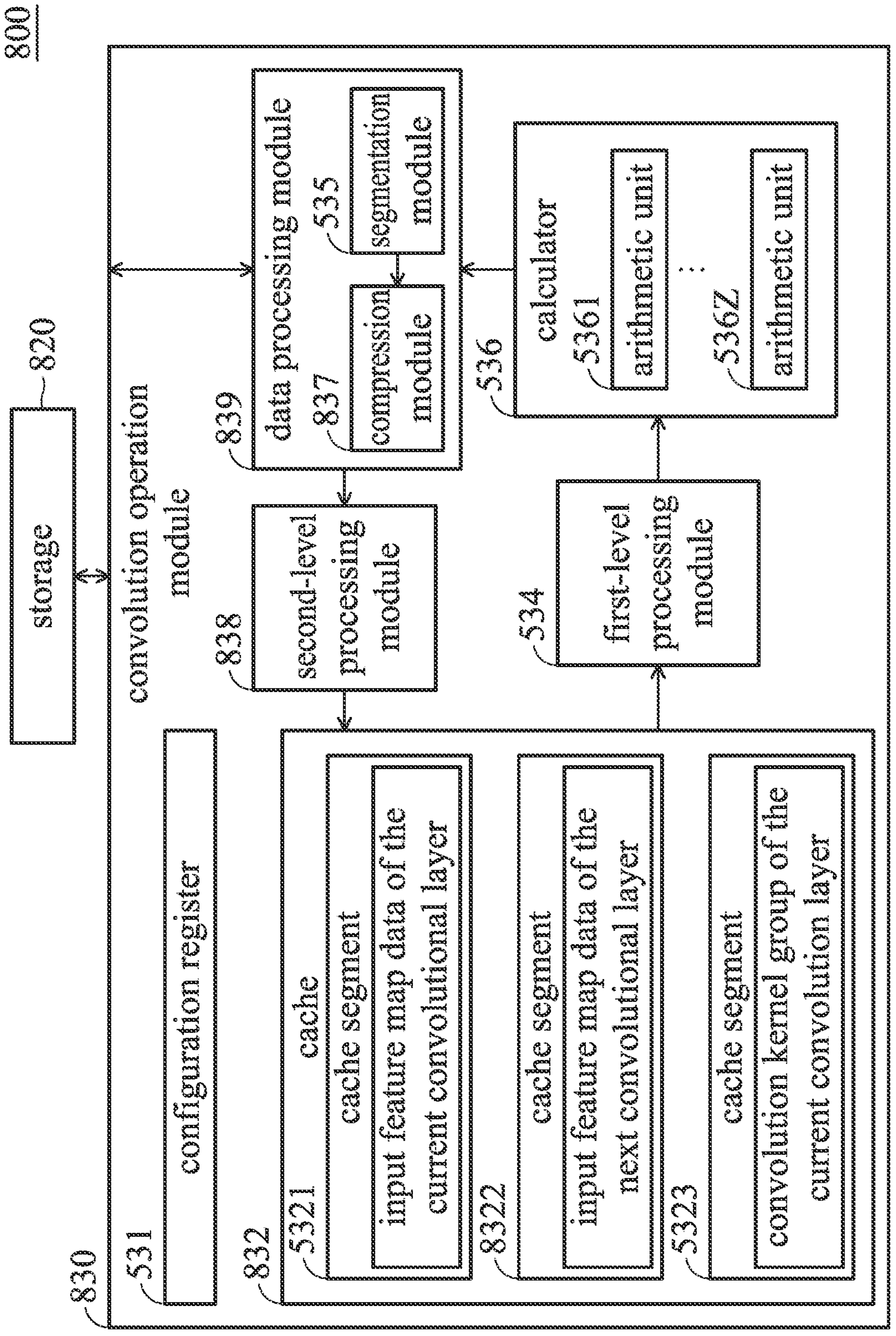
FIG. 8 is a block diagram of a computing device 800 including a convolution operation module in accordance with another embodiment of the present invention.

FIG. 8 is a block diagram of a computing device 800 including a convolution operation module in accordance with another embodiment of the present invention. Different from the computing device 500, the computing device 800 directly stores the output feature map (that is, the input feature map of the next convolutional layer) generated after the convolution operation in the cache (not in the storage). This avoids storing and reading the input feature map of the next convolutional layer from the storage. And, it can further improve the computing efficiency of the computing device 800. Hereinafter, the computing device 800 will be introduced in conjunction with FIGS. 9F-1 to 9F-2.

As shown in FIG. 8, the computing device 800 includes a storage 820 and a convolution operation module 830, and the storage 820 is coupled to the convolution operation module 830. The convolution operation module 830 includes a configuration register 531, a cache 832, a data processing module 839, a first-level processing module 534, a second-level processing module 838 and a calculator 536. The data processing module 839 is coupled to the second-level processing module 838 and the calculator 536. The second-level processing module 838 is coupled to the cache 832 and the data processing module 839, and the first-level processing module 534 is coupled to the cache 832 and the calculator 536. The configuration register 531, the first-level processing module 534, and the calculator 536 in the convolution operation module 830 are the same as the configuration register 531, the first-level processing module 534, and the calculator 536 in the convolution operation device 500, respectively. They won't be described again here. The cache 832, the second-level processing module 838, and the data processing module 839 are introduced below.

The cache 832 includes cache segments 5321, 5323, and 8322. The cache segments 5321, 5323 are the same as the cache segments 5321, 5323 in FIG. 5, and will not be repeated here. The cache segment 8322 is used to store the input feature map data of the next convolutional layer (see below for a detailed description). The data processing module 839 includes a segmentation module 535 and a compression module 837, and the compression module 837 is coupled to the segmentation module 535. The segmentation module 535 is the same as the segmentation module 535 in the data processing module 539 in FIG. 5, and will not be repeated here. As mentioned above, after the data processing module 839 receives the output feature map generated by the calculator 536 (that is, the input feature map of the next convolutional layer), the segmentation module 535 divides the output feature map into output data blocks (i.e., the next input data block of the convolutional layer), and then sends them to the compression module 837. The compression module 837 performs first-level compression on the received output data block and sends them to the second-level processing module 838, and then the second-level processing module 838 stores the first-level compressed output data blocks in the cache segment 8322 of the cache 832. Different from the computing device 500, the data processing module 839 directly stores the output data block after the first-level compression into the cache 832 through the second-level processing module 838 (instead of first storing it in the storage 820 and then using the second-level processing module 838 to read it back from the storage 820), thereby reducing the data transmission between the convolution operation module 830 and the storage 820. If the output feature map generated by the calculator 536 is the output feature map of the last convolutional layer, the data processing module 839 will directly store the received output feature map in the storage 820.

Since the input feature map of the first convolutional layer (stored in the storage 820) is the original input data of the convolution operation, before the computing device 800 performs the convolution operation, it needs to be first compressed and stored in the cache 832. Specifically, the computing device 800 reads the input feature map of the first convolutional layer from the storage section 821 of the storage 820 shown in FIG. 9A, and then sends it to the data processing module 839. The data processing module 839 then divides and compresses the received input feature map of the first convolutional layer through the segmentation module 535 and the compression module 837, and then stores it in the cache 832. The specific segmentation and compression process has been discussed above. It won't be repeated here. In one embodiment, the convolution operation module 830 also provides a decompression/compression interface for the outside modules. By calling the data processing module 839 through this decompression/compression interface, modules located outside the convolution operation module 830 can perform the decompression/compression operation. At this time, the data processing module 839 is simply called.

Figure 9A:
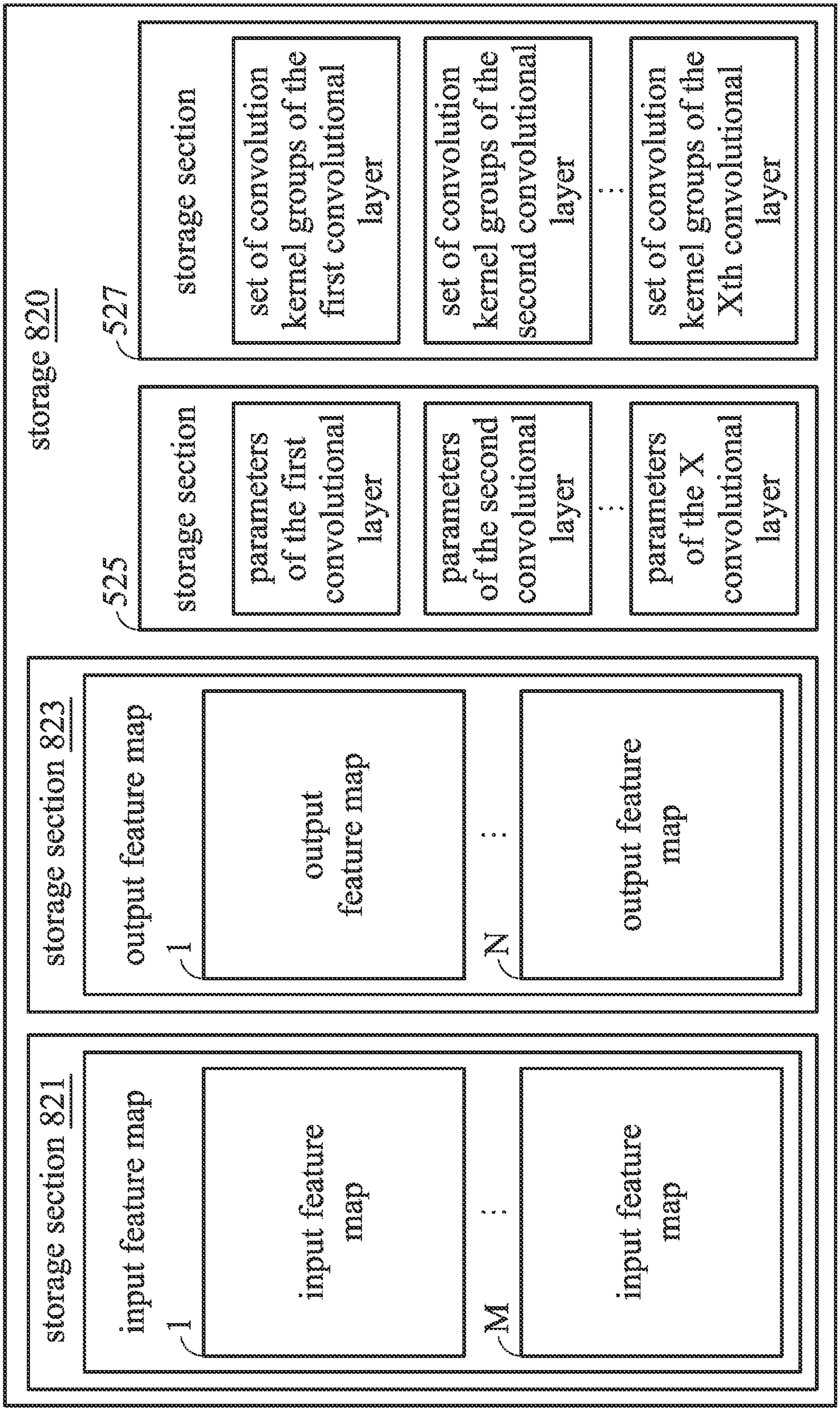
FIG. 9A is a schematic diagram of data stored in the storage 820 of the computing device 800 in accordance with one embodiment of the present invention.

FIG. 9A is a schematic diagram of data stored in the storage 820 of the computing device 800 in accordance with one embodiment of the present invention. As shown in FIG. 9A, the storage 820 includes storage sections 821, 823, 525, and 527. The storage sections 525 and 527 of the storage 820 are the same as the storage sections 525 and 527 of the storage 520, and will not be repeated here. The storage section 821 is used to store the input feature map set of the convolution operation (as described in the previous paragraph, that is, the set of input feature maps of the first convolutional layer). The storage section 823 is used to store the output feature map set of the convolution operation (the output feature map set of the last convolution layer).

Figure 9B:
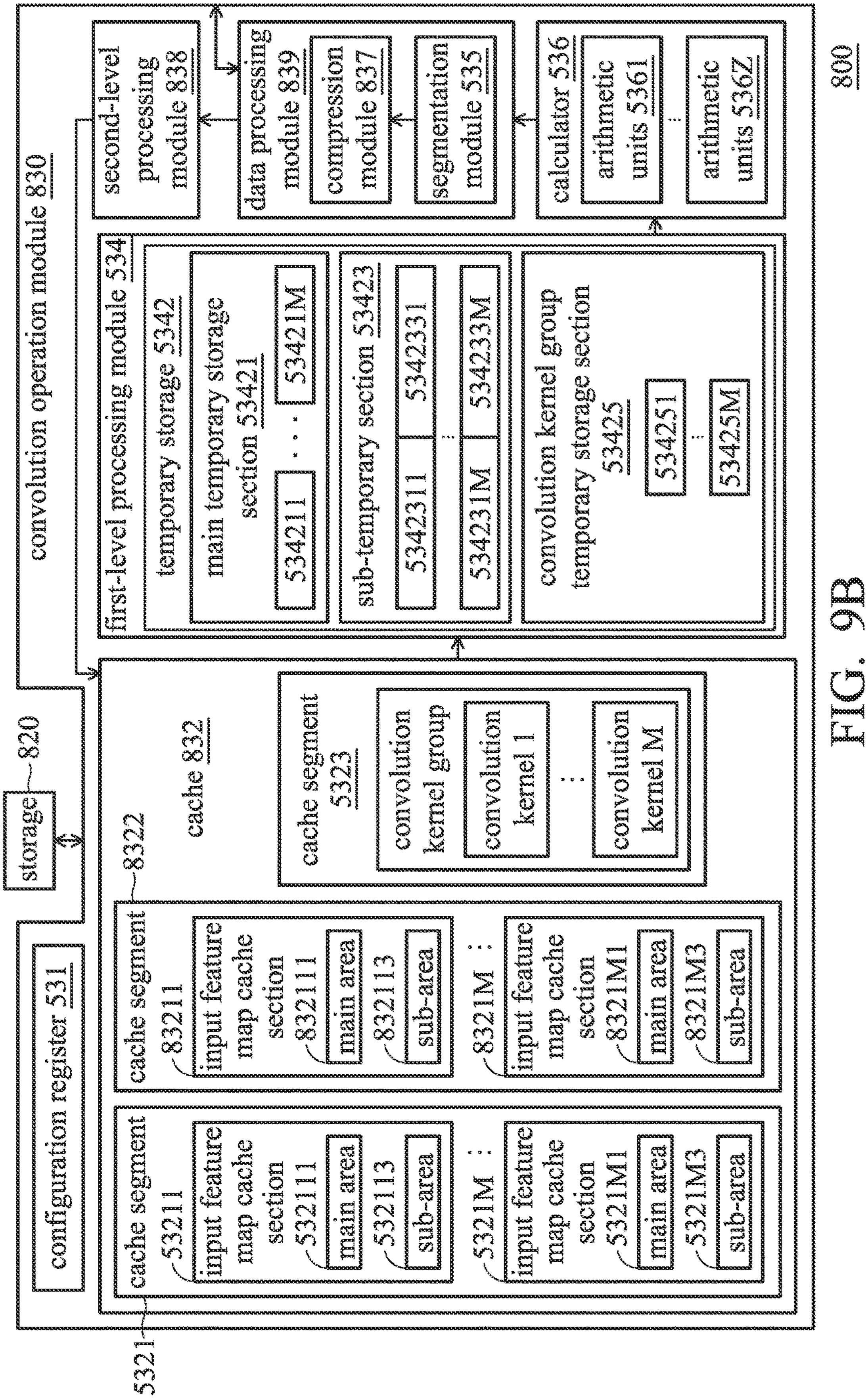
FIG. 9B is a more detailed block diagram of the computing device 800 in accordance with one embodiment of the present invention.

FIG. 9B is a more detailed block diagram of the computing device 800 in accordance with one embodiment of the present invention. As shown in FIG. 9B, the configuration register 531, the calculator 536, the first-level processing module 534, the cache section 5321, the cache section 5323 are the same as the configuration register 531, the calculator 536, and the first-level processing module 534, the cache section 5321, the cache segment 5323 in FIG. 6B, and will not be repeated here. The cache segment 8322 is used to store the input feature map data of the next convolutional layer, and its storage structure is exactly the same as that of the cache segment 5321. The difference is that the cache segment 5321 is used to store the input feature map data of the current convolutional layer, but the cache segment 8322 is used to store the input feature map data of the next convolutional layer. In an embodiment, the cache segments 5321 and 8322 may alternately be used to store the input feature map data of the current convolutional layer and the next convolutional layer. For example, in the process of performing convolution operations on the input data block of the Nth layer, the cache segment 5321 is used to store the input feature map data of the current convolutional layer (i.e., the Nth convolutional layer), and the cache segment 8322 is used to store the input feature map data of the next convolutional layer (i.e., the N+1th convolutional layer). In the process of performing convolution operations on the input data block of the N+1th layer, the cache segment 8322 is used to store the input feature map data of the current convolutional layer (i.e., the N+1th convolutional layer), and the cache segment 5321 is used to store the input feature map data of the next convolutional layer (that is, the N+2th convolutional layer), and so on.

Figure 9C:
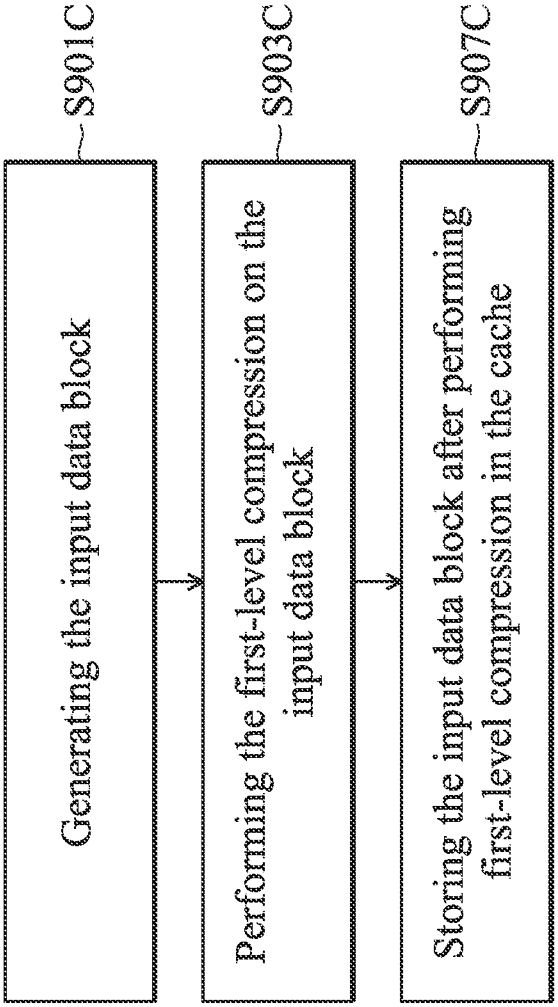
FIG. 9C is a processing flow chart of performing first-level compression on the input feature map of the Nth convolutional layer and then writing it into the cache in accordance with one embodiment of the present disclosure.

FIG. 9C is a processing flow chart of performing first-level compression on the input feature map of the Nth convolutional layer, and then writing it into the cache in accordance with one embodiment of the present disclosure. As shown in FIG. 9C, the data processing module 839 first generates the input data block (step S901C), then performs the first-level compression on the input data block (step 903C), and finally stores the input data block after the first-level compression in the cache 832 (Step S907C). Steps S901C and S903C in FIG. 9C are the same as steps S601C and S603C in FIG. 6C, and will not be repeated here. Step S907C is described below.

In step S907C, the second-level processing module 838 stores the input data block after performing first-level compression in the cache 832. In detail, the second-level processing module 838 performs first-level compression on the main area and sub-area of each input data block of the input feature map, and then stores them into the cache segment 8322 of the cache 832 (for example, the input feature map of the Nth convolutional layer is stored in the cache segment 8322) or the cache segment 5321 (for example, the input feature map of the N+1th convolutional layer is stored in the cache segment 5321, that is, the output feature map of the Nth convolutional layer is stored in the cache segment 5321).

Figure 9D:
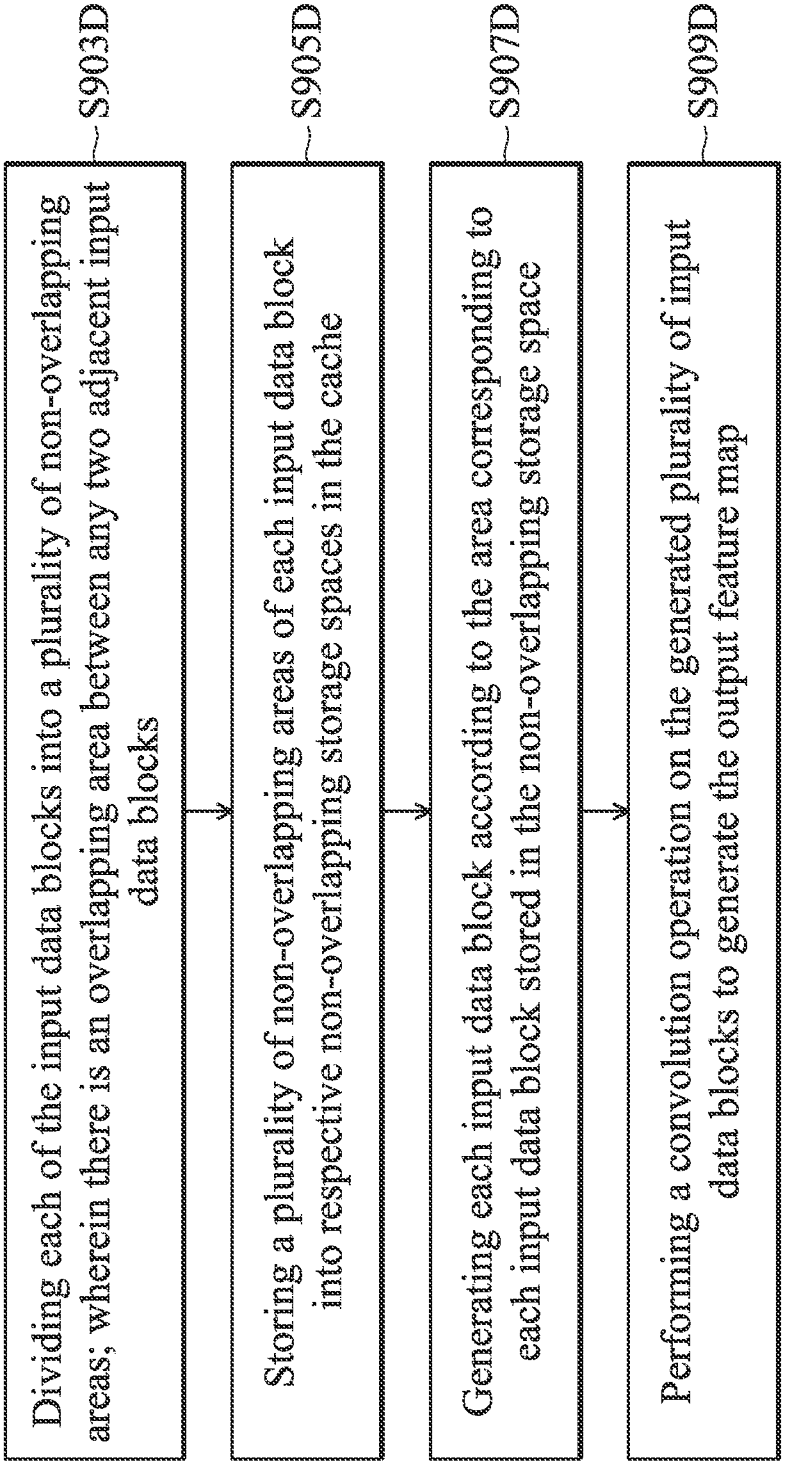
FIG. 9D is a processing flow for the computing device 800 to generate an output feature map in accordance with one embodiment of the present disclosure.

After receiving the notification of starting the convolution operation, the computing device 800 will use the processing flow chart in the FIG. 9D or FIG. 9E (to be detailed later) to perform a convolution operation on the input feature map set of the first convolutional layer with each convolution kernel group, so as to generate each output feature map corresponding to each convolution kernel group. As shown in FIG. 9D, the processing flow of the computing device 800 to perform a convolution operation on the input feature map set with a convolution kernel group to generate an output feature map is: dividing each of the input data blocks into a plurality of non-overlapping areas, wherein there is an overlapping area between any two adjacent input data blocks (step S903D); storing a plurality of non-overlapping areas of each input data block into respective non-overlapping storage spaces in the cache (S905D); generating each input data block according to the area corresponding to each input data block stored in the non-overlapping storage space (S907D); performing a convolution operation on the generated plurality of input data blocks to generate the output feature map (S909D). Steps S903D, S907D, and S909D in FIG. 9D are the same as steps S903D, S907D, and S909D in FIG. 6D, and will not be repeated here. Step S905D is described below.

In step S905D, the computing device 800 stores a plurality of non-overlapping areas of each input data block into respective non-overlapping storage spaces in the cache. In detail, the second-level processing module 838 of the computing device 800 performs first-level compression on multiple non-overlapping areas of the multiple input data blocks generated in step S903D and stores them in the cache segment 8322 or 5321 of the cache 832.

Figure 9E:
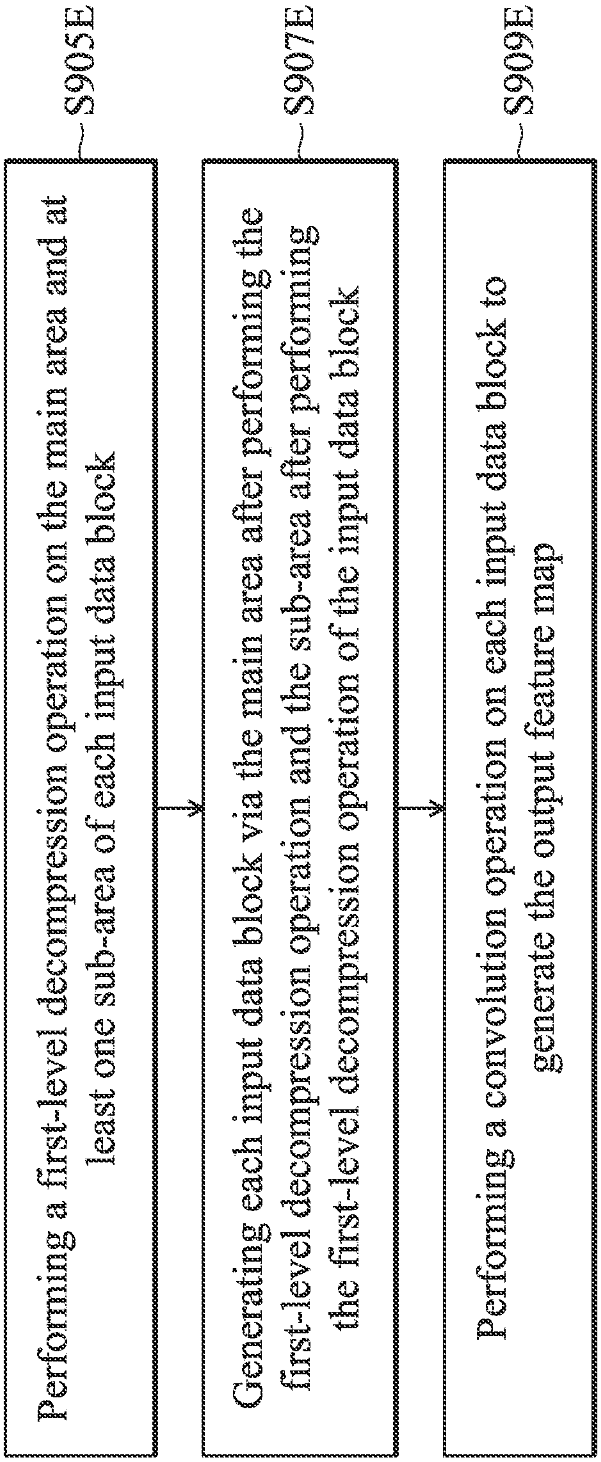
FIG. 9E is a processing flow chart of generating an output feature map by the computing device 800 in accordance with another embodiment of the present invention.

FIG. 9E is a processing flow chart of generating an output feature map through the use of the computing device 800 in accordance with another embodiment of the present invention. As shown in FIG. 9E, the processing flow of the computing device 800 to generate an output feature map is: performing a first-level decompression operation on the main area and at least one sub-area of each input data block (step S905E); generating each input data block via the main area after performing the first-level decompression operation and the sub-area after performing the first-level decompression operation of the input data block (S907E); performing a convolution operation on each input data block to generate the output feature map (S909E). Steps S907E and S909E in FIG. 9E are the same as steps S607E and S609E in FIG. 6E, and will not be repeated here. The following describes step S905E.

In step S905E, the computing device 800 performs a first-level decompression operation on the main area and at least one sub-area of each input data block. In detail, the computing device 500 reads the main area and the sub-area of the input data block from the cache 532, wherein the main area and the sub-area of the input data block have been compressed using the first-level compression method. The computing device 500 performs a first-level decompression operation on the main area and sub-area and stores them in the temporary storage 5342. For a more detailed process, refer to the description of step S913F in FIGS. 9F-1 to 9F-2 as below.

Figures 1, 9F:
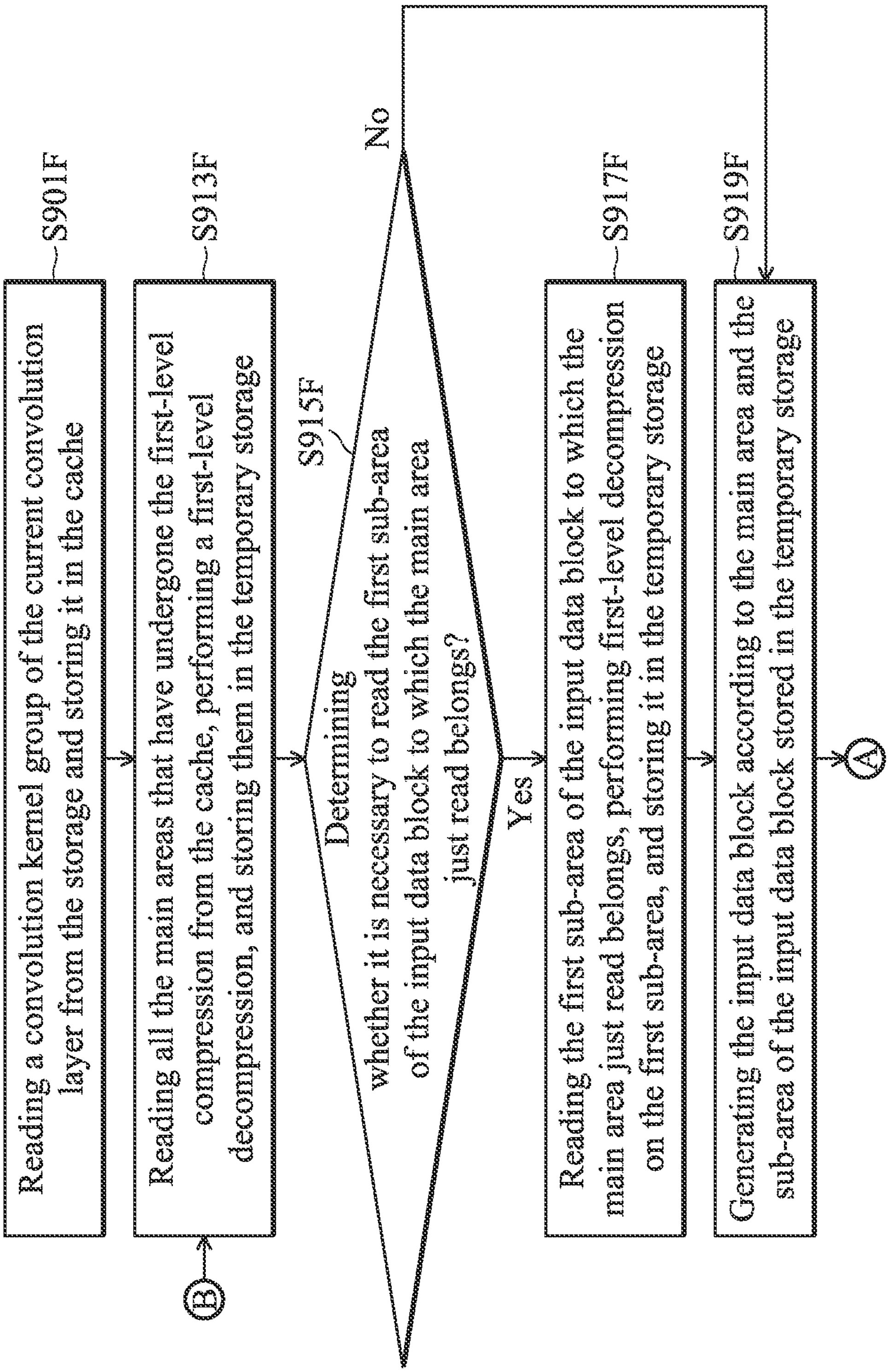
Figures 2, 9F:
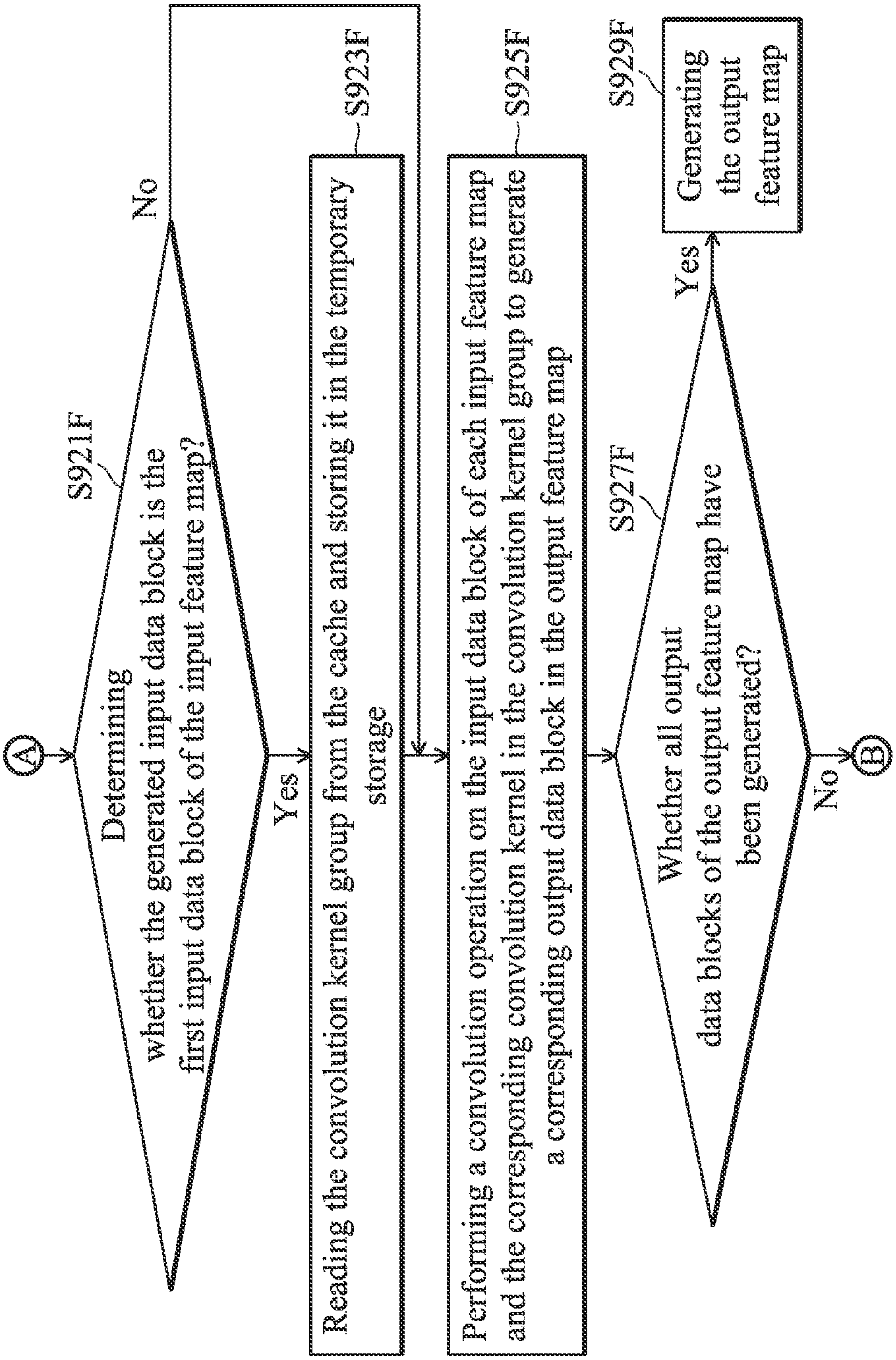

FIGS. 9F-1 to 9F-2 are more detailed processing flow charts of generating an output feature map with the computing device 800 in accordance with one embodiment of the present invention. As shown in the figure, FIGS. 9F-1 to 9F-2 describe the processing flow in which the computing device 800 performs a convolution operation on an input feature map set and a convolution kernel group to generate an output feature map during the convolution operation process. When the space of the cache 832 is large enough, the computing device 800 will directly store the output feature map generated by each convolutional layer (not including the last convolutional layer, and the output feature map of the last convolutional layer will be directly stored in the storage 820) into the cache 832 after segmentation and first-level compression during the convolution operation. The computing device 800 does not need to send the output feature map generated by each convolution layer to the storage 820, and then load it from the storage 820 to the convolution operation module 830 for processing. In this way, the data transmission between the convolution operation module 830 and the storage 820 can be reduced, and therefore, the efficiency of the entire system when performing the convolution operation can be improved.

FIGS. 9F-1 to 9F-2 include steps S901F, S913F, S915F, S917F, S919F, S921F, S923F, S925F, S927F, and S929F. The steps S901F, S913F, S915F, S917F, S919F, S921F, S923F, S925F, and S929F are the same as steps S601F, S613F, S615F, S617F, S619F, S621F, S623F, S625F and S629F in FIGS. 6F-1 to 6F-2, and will not be repeated here. The difference from FIGS. 6F-1 to 6F-2 is that, in step S927F, when the convolution operation module 830 determines whether all output data blocks of the output feature map have been generated, if the determination result is no, then step S913F is executed.

With the convolution operation method and convolution operation device described in the invention, when there are overlapping areas between the input data blocks of the input feature map, the input data blocks are divided into non-overlapping areas for storing. More input data blocks can be cached in the convolution operation device, thereby reducing the number of pauses of the convolution operation module, thereby improving the operation efficiency of the convolution operation module.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of other implementations as may be desired and advantageous for any given or particular application.

What is claimed is:

1. A convolution operation method executed by a convolution operation device, wherein the convolution operation device comprises a cache, wherein the input feature map is divided into a plurality of input data blocks, the input feature map is an input of a current convolutional layer, and the convolution operation method comprises using a Convolutional Neural Network (CNN) accelerator to:

divide each of the input data blocks into a plurality of non-overlapping areas, wherein each of the non-overlapping areas of each of the input data blocks does not overlap with any adjacent input data block, wherein there is an overlapping area exists between any two adjacent input data blocks;

perform a two-level compression comprising a first-level compression followed by a second level compression on each of the input data blocks and store each of the compressed input data blocks that has undergone two-level compression into a storage;

read each compressed input data block of the input data blocks that has undergone the two-level compression from the storage and perform a second-level decompression;

store non-overlapping areas of each input data block that has undergone the second-level decompression into a respective non-overlapping storage space in the cache, such that overlapping portions of adjacent input data blocks are not redundantly stored in the cache;

generate each input data block according to an area corresponding to each input data block, which has undergone the first-level compression, stored in the non-overlapping storage spaces by reconstructing each input data block using cached non-overlapping areas and selectively retrieved overlapping areas; and perform a convolution operation by the CNN accelerator on the plurality of generated input data blocks to generate the output feature map, wherein the output feature map is an output of the current convolutional layer and is taken as an input of a next convolutional layer, and wherein the two-level compression, selective cache storage of non-overlapping areas, and reconstruction of the input data blocks are configured to reduce redundant memory access operations between the CNN accelerator and external storage and to reduce cache contention within the CNN accelerator during execution of the convolution operation by the CNN accelerator, wherein the second-level compression is a Huffman algorithm or a Lempel-Ziv & Welch (LZW) algorithm;

wherein data that has undergone the first-level compression comprises a Length field, a Mask field, and a DesData field;

wherein the DesData field contains all non-zero elements in matrix;

wherein the Mask field indicates a number of elements in the matrix and marks the position of non-zero elements in the matrix;

wherein the Length field indicates the length of the DesData field;

wherein the second-level compression is performed after the first-level compression.

2. The convolution operation method of claim 1, further comprising:

each of the input data blocks is divided into a main area and at least one sub-area;

wherein the main area includes a non-overlapping area and at least one overlapping area, wherein the non-overlapping area included in the main area does not overlap with any adjacent input data block, and each overlapping area included in the main area only overlaps with one adjacent input data block.

3. The convolution operation method of claim 2, wherein areas included in the at least one sub-area all overlap with at least one adjacent input data block.

4. The convolution operation method of claim 2, wherein the at least one sub-area includes at least one overlapping sub-area, wherein the number of input data blocks adjacent to the at least one overlapping sub-area is greater than the number of input data blocks adjacent to the at least one overlapping area of the main area.

5. The convolution operation method of claim 1, further comprising for each of the input data blocks, using the CNN accelerator to:

store a main area of the input data block in a main cache segment of the cache; and store at least one sub-area of the input data block in a secondary cache segment of the cache;

wherein the main cache segment and the secondary cache segment do not overlap.

6. The convolution operation method of claim 5, further comprising for each of the input data blocks, using the CNN accelerator to:

splice a non-overlapping area and at least one overlapping area corresponding to the main area of the input data block, and an overlapping area corresponding to the at least one sub-area of the input data block to generate the input data block.

7. The convolution operation method of claim 6, wherein for each of the input data blocks, the at least one sub-area of the input data block includes a first sub-area, wherein the first sub-area includes a first overlapping sub-area, a second overlapping sub-area, and a third overlapping sub-area, wherein the number of adjacent input data blocks overlapping with the second overlapping sub-area is less than the number of adjacent input data blocks overlapping with the first overlapping sub-area, the number of adjacent input data blocks overlapping with the second overlapping sub-area is less than the number of adjacent input data blocks overlapping with the third overlapping sub-area.

8. The convolution operation method of claim 6, wherein for each of the input data blocks, the at least one sub-area of the input data block includes a first sub-area, wherein the first sub-area includes a first overlapping sub-area, a second overlapping sub-area, and a third overlapping sub-area, wherein the second overlapping sub-area only overlaps with one adjacent input data block, the first overlapping sub-area overlaps with three adjacent input data blocks, and the third overlapping sub-area overlaps with three adjacent input data blocks.

9. The convolution operation method of claim 5, further comprising for each of the input data blocks, using the CNN accelerator to:

read the at least one sub-area of the input data block according to the main area; and generate the input data block according to the main area and the at least one sub-area of the input data block.

10. The convolution operation method of claim 9, wherein the step of generating the input data block according to the main area and the at least one sub-area of the input data block further comprising for each of the input data blocks, using the CNN accelerator to:

generate the input data block by splicing the main area and the at least one sub-area of the input data block.

11. A convolution operation device wherein the input feature map is divided into a plurality of input data blocks, and the convolution operation device comprising:

a cache; and a Convolutional Neural Network (CNN) accelerator coupled to the cache and configured to:

divide each of the input data blocks into a plurality of non-overlapping areas, wherein each of the non-overlapping areas of each of the input data blocks does not overlap with any adjacent input data block, wherein there is an overlapping area exists between any two adjacent input data blocks;

perform a two-level compression comprising a first-level compression followed by a second level compression on each of the compressed input data blocks and store each of the input data blocks that has undergone two-level compression into a storage;

read each compressed input data block of the input data blocks that has undergone the two-level compression from the storage and perform a second-level decompression;

store non-overlapping areas of each input data block that has undergone the second-level decompression into a respective non-overlapping storage space in the cache, such that overlapping portions of adjacent input data blocks are not redundantly stored in the cache;

generate each input data block according to an area corresponding to each input data block, which has undergone the first-level compression, stored in the non-overlapping storage spaces by reconstructing each input data block using cached non-overlapping areas and selectively retrieved overlapping areas; and perform a convolution operation by the CNN accelerator on the plurality of generated input data blocks to generate the output feature map, wherein the output feature map is an output of a current convolutional layer and is taken as an input of a next convolutional layer, and wherein the two-level compression, selective cache storage of non-overlapping areas, and reconstruction of the input data blocks are configured to reduce redundant memory access operations between the CNN accelerator and external storage and to reduce cache contention within the CNN accelerator during execution of the convolution operation by the CNN accelerator, wherein the second-level compression is a Huffman algorithm or a Lempel-Ziv & Welch (LZW) algorithm;

wherein data that has undergone the first-level compression comprises a Length field, a Mask field, and a DesData field;

wherein the DesData field contains all non-zero elements in matrix;

wherein the Mask field indicates a number of elements in the matrix and marks the position of non-zero elements in the matrix;

wherein the Length field indicates the length of the DesData field;

wherein the second-level compression is performed after the first-level compression.

12. The convolution operation device of claim 11, wherein the CNN accelerator is further configured to divide each of the input data blocks into a main area and at least one sub-area;

wherein the main area includes a non-overlapping area and at least one overlapping area, wherein the non-overlapping area included in the main area does not overlap with any adjacent input data block, and each overlapping area included in the main area only overlaps with one adjacent input data block.

13. The convolution operation device of claim 12, wherein areas included in the at least one sub-area all overlap with at least one adjacent input data block.

14. The convolution operation device of claim 12, the at least one sub-area includes at least one overlapping sub-area, wherein the number of input data blocks adjacent to the at least one overlapping sub-area is greater than the number of input data blocks adjacent to the at least one overlapping area of the main area.

15. The convolution operation device of claim 11, wherein for each of the input data blocks, the CNN accelerator is further configured to store a main area of the input data block in a main cache segment of the cache; and store at least one sub-area of the input data block in the secondary cache segment of the cache;

wherein the main cache segment and the secondary cache segment do not overlap.

16. The convolution operation device of claim 15, wherein for each of the input data blocks, the CNN accelerator is further configured to splice a non-overlapping area and at least one overlapping area corresponding to the main area of the input data block, and an overlapping area corresponding to the at least one sub-area of the input data block to generate the input data block.

17. The convolution operation device of claim 16, wherein for each of the input data blocks, the at least one sub-area of the input data block includes a first sub-area, wherein the first sub-area includes a first overlapping sub-area, a second overlapping sub-area, and a third overlapping sub-area, wherein the number of adjacent input data blocks overlapping with the second overlapping sub-area is less than the number of adjacent input data blocks overlapping with the first overlapping sub-area, the number of adjacent input data blocks overlapping with the second overlapping sub-area is less than the number of adjacent input data blocks overlapping with the third overlapping sub-area.

18. The convolution operation device of claim 16, wherein for each of the input data blocks, the at least one sub-area of the input data block includes a first sub-area, wherein the first sub-area includes a first overlapping sub-area, a second overlapping sub-area, and a third overlapping sub-area, wherein the second overlapping sub-area only overlaps with one adjacent input data block, the first overlapping sub-area overlaps three adjacent input data blocks, and the third overlapping sub-area overlaps with three adjacent input data blocks.

19. The convolution operation device of claim 15, wherein for each of the input data blocks, the CNN accelerator is further configured read to the at least one sub-area of the input data block according to the main area; and generate the input data block according to the main area and the at least one sub-area of the input data block.

20. The convolution operation device of claim 19, wherein for each of the input data blocks, the CNN accelerator is further configured to generate the input data block by splicing the main area and the at least one sub-area of the input data block, so as to generate the input data block according to the main area and the at least one sub-area of the input data block.

* * * * *